(12) United States Patent
Shniberg et al.

(10) Patent No.: US 11,504,748 B2
(45) Date of Patent: Nov. 22, 2022

(54) SYSTEMS AND METHODS FOR SORTING OF SEEDS

(71) Applicant: SeedX Technologies Inc., Wilmington, DE (US)

(72) Inventors: Mordekhay Shniberg, Magshimim (IL); Elad Carmon, Petach-Tikva (IL); Sarel Ashkenazy, Rehovot (IL); David Gedalyaho Vaisberger, Jerusalem (IL); Sharon Ayal, Kibbutz Bet Nir (IL)

(73) Assignee: SeedX Technologies Inc., Wilmington, DE (US)

(*) Notice: Subject to any disclaimer, the term of this patent is extended or adjusted under 35 U.S.C. 154(b) by 268 days.

(21) Appl. No.: 16/769,261

(22) PCT Filed: Dec. 3, 2018

(86) PCT No.: PCT/IB2018/059569
§ 371 (c)(1),
(2) Date: Jun. 3, 2020

(87) PCT Pub. No.: WO2019/106639
PCT Pub. Date: Jun. 6, 2019

(65) Prior Publication Data
US 2020/0338599 A1     Oct. 29, 2020

Related U.S. Application Data

(60) Provisional application No. 62/712,270, filed on Jul. 31, 2018, provisional application No. 62/593,949, filed on Dec. 3, 2017.

(51) Int. Cl.
*B07C 5/342* (2006.01)
*A01C 1/00* (2006.01)
(Continued)

(52) U.S. Cl.
CPC .............. *B07C 5/3425* (2013.01); *A01C 1/00* (2013.01); *G06K 9/628* (2013.01); *G06K 9/6257* (2013.01);
(Continued)

(58) Field of Classification Search
CPC ......... B07C 5/3425; A01C 1/00; A01C 21/00; G06K 9/6257; G06K 9/6265; G06K 9/628;
(Continued)

(56) References Cited

U.S. PATENT DOCUMENTS 9,058,518 B2   6/2015   Conrad et al.
9,156,064 B2   10/2015  Koehler et al.
(Continued)

FOREIGN PATENT DOCUMENTS

IT   RM20110304   12/2012
JP   2020-075793   4/2020
(Continued)

OTHER PUBLICATIONS

Official Action dated Nov. 16, 2021 from US Patent and Trademark Office Re. U.S. Appl. No. 16/769,273. (19 pages).
(Continued)

*Primary Examiner* — Qun Shen

(57) ABSTRACT

Systems for sorting seeds are disclosed, as well as batches of seeds that have been sorted using the systems.

19 Claims, 6 Drawing Sheets

(51) Int. Cl.
| | |
|---|---|
| *G06K 9/62* | (2022.01) |
| *G06N 3/04* | (2006.01) |
| *G06N 3/08* | (2006.01) |
| *A01C 21/00* | (2006.01) |
| *G06V 20/68* | (2022.01) |

(52) U.S. Cl.
CPC ......... *G06K 9/6265* (2013.01); *G06K 9/6276* (2013.01); *G06N 3/04* (2013.01); *G06N 3/08* (2013.01); *A01C 21/00* (2013.01); *B07C 2501/009* (2013.01); *G06V 20/68* (2022.01)

(58) Field of Classification Search
CPC .......... G06K 9/6276; G06N 3/04; G06N 3/08; G06V 20/68
See application file for complete search history.

(56) References Cited

U.S. PATENT DOCUMENTS

| | | | | |
|---|---|---|---|---|
| 2008/0152231 | A1* | 6/2008 | Gokturk | G06Q 30/08 382/209 |
| 2008/0310674 | A1* | 12/2008 | Modiano | G01N 21/6428 382/100 |
| 2011/0202169 | A1* | 8/2011 | Koehler | B07C 5/342 700/223 |
| 2011/0249905 | A1* | 10/2011 | Singh | G06V 30/412 382/225 |
| 2011/0258195 | A1* | 10/2011 | Welling | G06V 30/182 707/E17.09 |
| 2017/0178060 | A1* | 6/2017 | Schwartz | G06V 10/44 |
| 2020/0293814 | A1 | 9/2020 | Shniberg et al. | |
| 2020/0367422 | A1 | 11/2020 | Shniberg et al. | |

FOREIGN PATENT DOCUMENTS

| | | |
|---|---|---|
| WO | WO 2008/150903 | 12/2008 |
| WO | WO 2019/106638 | 6/2019 |
| WO | WO 2019/106639 | 6/2019 |
| WO | WO 2019/106641 | 6/2019 |
| WO | WO 2019/241123 | 12/2019 |

OTHER PUBLICATIONS

Communication dated Feb. 4, 2022 Fron The Netherlands Patent Office Re AplicationNo. NL 2028466. (8 Pages).
International Preliminary Report on Patentability dated Jun. 18, 2020 From the International Bureau of WIPO Re. Application No. PCT/IB2018/059568. (18 Pages).
International Preliminary Report on Patentability dated Jun. 18, 2020 From the International Bureau of WIPO Re. Application No. PCT/IB2018/059569. (18 Pages).
International Preliminary Report on Patentability dated Jun. 18, 2020 From the International Bureau of WIPO Re. Application No. PCT/IB2018/059572. (18 Pages).
International Search Report and the Written Opinion dated Jun. 4, 2019 From the International Searching Authority Re. Application No. PCT/IB2018/059572. (27 Pages).
International Search Report and the Written Opinion dated May 15, 2019 From the International Searching Authority PCT/IB2018/059569. (25 Pages).
International Search Report and the Written Opinion dated May 16, 2019 From the International Searching Authority Re. Application No. PCT/IB2018/059568. (27 Pages).
Invitation to Pay Additional Fees, Communication Relating to the Results of the Partial International Search and the Provisional Opinion dated Mar. 19, 2019 From the International Searching Authority PCT/IB2018/059568. (21 Pages).
Invitation to Pay Additional Fees, Communication Relating to the Results of the Partial International Search and the Provisional Opinion dated Mar. 19, 2019 From the International Searching Authority PCT/IB2018/059569. (20 Pages).
Invitation to Pay Additional Fees, Communication Relating to the Results of the Partial International Search and the Provisional Opinion dated Mar. 21, 2019 From the International Searching Authority Re. Application No. PCT/IB2018/059572. (21 Pages).
Pinto et al. "Classification of Green Coffee Bean Images Based on Defect Types Using Convolutional Neural Network (CNN)", IEEE 2017 International Conference on Advanced Informatics, Concepts, Theory, and Applications, ICAITA, XP033244546, p. 1-5, Aug. 16, 2017.
Veeramani et al. "Deep Learning for Classifying Maize Seeds in Double Haploid Induction Process", 13th International Symposium on Bioinformatics Research and Applications, XP055567245, p. XXXVIII-XXXIX, May 30, 2017.
Veeramani et al. "DeepSort: Deep Convolutional Networks for Sorting Haploid Maize Seeds", BMC Bioinformatics, XP021259500, 19(Suppl.9): 85-93, May 30, 2017.
Vlasov et al. "A Machine Learning Approach for Grain Crop's Seed Classification in Purifying Separation", International Conference on Information Technologies in Business and Industry 2016, Journal of Physics: Conference Series, XP055567308, 012177-1-012177-6, Mar. 25, 2017.
Vlasov et al. "Comparison of Object Classification Methods in Seed Stream Separation", Proceedings of the IV International Research Conference 'Information Technologies in Science, Management, Social Sphere and Medicine', ITSMSSM 2017, XP055567314, Paris, France, Dec. 5, 2017, Advances in Computer Science Research, ACSR,XP055567314, 72: 179-181, Dec. 5, 2017.
Communication Pursuant to Article 94(3) EPC dated Mar. 30, 2022 From the European Patent Office Re. Application No. 18830525.4. (7 Pages).
Communication Pursuant to Article 94(3) EPC dated Mar. 30, 2022 From the European Patent Office Re. Application No. 18833300.9. (6 Pages).
Communication Pursuant to Article 94(3) EPC dated Mar. 30, 2022 From the European Patent Office Re. Application No. 18834003.8. (6 Pages).
Restriction Official Action dated May 3, 2022 from US Patent and Trademark Office Re. U.S. Appl. No. 16/769,250. (5 pages).

\* cited by examiner

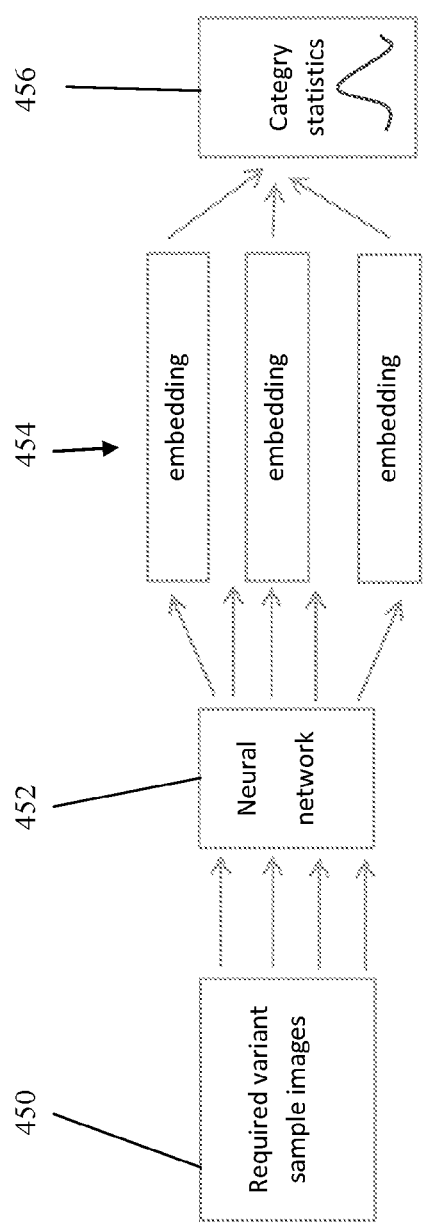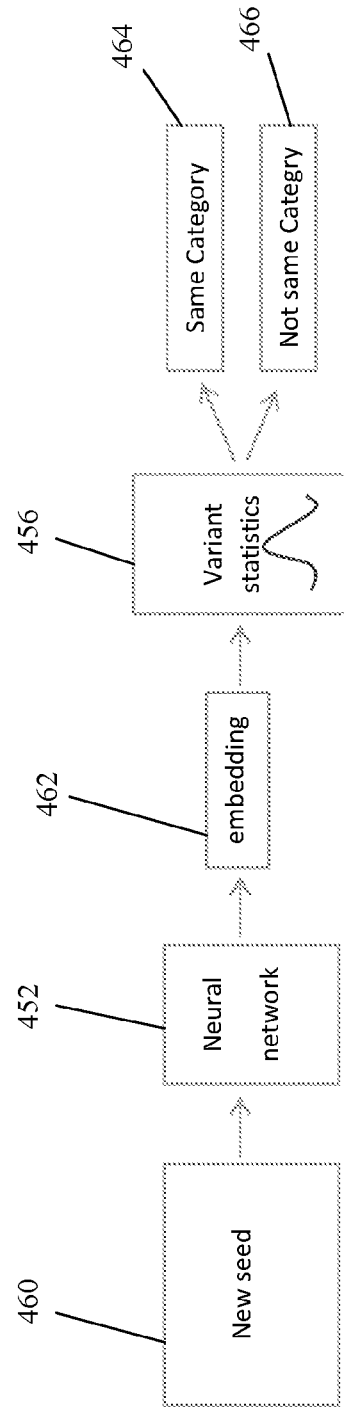
FIG. 4D
FIG. 4E

SYSTEMS AND METHODS FOR SORTING OF SEEDS

RELATED APPLICATIONS

This application is a National Phase of PCT Patent Application No. PCT/IB2018/059569 having International filing date of Dec. 3, 2018, which claims the benefit of priority under 35 USC § 119(e) of U.S. Provisional Patent Application Nos. 62/593,949 filed on Dec. 3, 2017 and 62/712,270 filed on Jul. 31, 2018. The contents of the above applications are all incorporated by reference as if fully set forth herein in their entirety.

FIELD AND BACKGROUND OF THE INVENTION

The present invention, in some embodiments thereof, relates to seed analysis and, more specifically, but not exclusively, to systems and methods for sorting of seeds.

Hybrid seeds are seeds that are generated by cross pollination of two parent plants. The produced offspring seed contains genetic material and thus traits coming from both parents. The parents plants are produced after a long R&D process and most of their DNA is homozygous, a process called stabilizing the parents. Because the parents are stabilized, the produced F1 offspring are genetically uniform and contain the desired traits. Many crops have the ability to self-pollinate, which will generate a fruit and seeds which contains only the maternal genetics, without the parental plant involved in the process. The self-pollinated seeds, which don't contain the required parental genetics, don't contain the required traits.

Separation of seeds according to desired seed properties has traditionally been performed manually, which is an error-prone, and time-consuming task.

SUMMARY OF THE INVENTION

According to an aspect of some embodiments of the present invention there is provided a system for sorting of seeds, comprising:
a non-transitory memory having stored thereon a code for execution by at least one hardware processor, the code comprising:
code for inputting into at least one neural network, at least one image including at least one seed, the at least one image captured by at least one imaging sensor;
code for computing by the at least one neural network, an indication of at least one classification category for the at least one seed, wherein the indication of at least one classification category is computed at least according to weights of the at least one neural network, wherein a trained non-neural network statistical classifier computes the at least one classification category with statistical insignificance according to at least one explicitly defined visual feature extracted from the at least one image based on at least one of a visual and a physical property of the at least one seed;
wherein the at least one neural network is trained according to a training dataset comprising a plurality of training images of a plurality of seeds captured by the at least one imaging sensor, wherein each respective training image of the plurality of training images is associated with an indication of at least one classification category of at least one seed depicted in the respective training image; and
code for generating according to the indication of at least one classification category, instructions for execution by a sorting controller of an automated sorting device for automated sorting of seeds.

According to some embodiments of the invention, the at least one image includes a plurality of seeds, wherein the trained non-neural network statistical classifier classifies the at least one image of the plurality of seeds into a same at least one classification category according to the at least one visual feature, wherein the neural network classifiers the at least one image of the plurality of seeds with statistical significance into two or more different classification categories.

According to some embodiments of the invention, the at least one visual feature extracted from the at least one image of a first seed is statistically similar within a tolerance requirement to a corresponding at least one visual feature extracted from the at least one image of a second seed.

According to some embodiments of the invention, the at least one visual feature based on the physical property is selected from the group consisting of: a hand-crafted feature, at least one size dimension of the at least one seed, color of the at least one seed, shape of the at least one seed, and texture of the at least one seed.

According to some embodiments of the invention, the at least one image includes a plurality of seeds that differ from one another within a tolerance range by a single feature that cannot be extracted by the at least one visual feature, and further comprising computing clusters according to a respective binary classification category computed for each seed, wherein the respective binary classification category is indicative of the respective seed including the single feature or not including the single feature, and wherein the instructions include instructions for sorting the seeds according to the computed clusters.

According to some embodiments of the invention, the binary classification category indicative of the single feature is selected from the group consisting of: self pollinated or hybrid pollinated, stress-resistant or non-stress resistant, genetically modified or non-genetically modified, isogenic seeds that differ by the single feature, and seeds of a shared mother plant with different paternal pollen.

According to some embodiments of the invention, the at least one classification category comprises a non-visual category that cannot be manually determined based on visual inspection of the at least one seed.

According to some embodiments of the invention, the at least one classification category comprises a seed variant.

According to some embodiments of the invention, the at least one classification category is not directly correlated to DNA markers.

According to some embodiments of the invention, the at least one classification category is a yield-related trait.

According to some embodiments of the invention, the at least one classification category is a monogenetic trait, a pleiotropic trait or a polygenetic trait.

According to some embodiments of the invention, the at least one classification category is a plant quality related trait.

According to some embodiments of the invention, the plant quality related trait comprises a resistance to infection, resistance to stress, reduced allergenicity trait, predicted germination ratio, fruit taste, fruit size, vigor, oil content, fiber quality, fiber length, grain filling period, flowering, heading, plant height, photosynthetic capacity and fertilizer use efficiency.

According to some embodiments of the invention, the indication of the at least one classification category associated with respective plurality of training images of the training dataset is based on a DNA test destructive to the seed from which it was obtained.

According to some embodiments of the invention, the yield-related trait is selected from the group consisting of growth rate, biomass, fiber yield, and harvest index.

According to some embodiments of the invention, the at least one classification category is a genotype.

According to some embodiments of the invention, the at least one classification category is determined by a destructive test that destroys the respective seed after the respective training image of the seed is captured by the at least one imaging sensor.

According to some embodiments of the invention, the at least one classification category denotes at least one phenotypical property predicted to develop in the at least one seed at a future time interval relative to a time interval when the at least one image is captured.

According to some embodiments of the invention, the imaging sensor is selected from the group consisting of: RGB, multispectral, hyperspectral, visible light frequency range, near infrared (NIR) frequency range, infrared (IR) frequency range, and combinations of the aforementioned.

According to some embodiments of the invention, the at least image including at least one seed comprises a single image of a single seed segmented from an image including a plurality of seeds.

According to some embodiments of the invention, the indication of the at least one classification category associated with respective plurality of training images of the training dataset comprises a seed variant determined according to a parent plant.

According to some embodiments of the invention, the at least one neural network computes an embedding for the at least one image, and wherein the at least one classification category is determined according to an annotation of an identified at least one similar embedded image from the training dataset storing embeddings of training images, the at least one similar embedded image identified according to a requirement of a similarity distance between the embedding of the at least one image and embedding of the training images.

According to some embodiments of the invention, the embedding is computed by an internal layer of the trained at least one neural network selected as an embedding layer.

According to some embodiments of the invention, the embedding is stored as a vector of a predefined length, wherein the similarity distance is computed as a distance between a vector storing the embedding of the at least one image and a plurality of vectors each storing embedding of respective training images.

According to some embodiments of the invention, the similarity distance is computed between the embedding of the at least one image and a cluster of embeddings of a plurality of training images each associated with a same at least one classification category.

According to some embodiments of the invention, the at least one image comprises a plurality of images including a plurality of seeds, and further comprising code for clustering the plurality of images according to respective classification categories, wherein the instructions for execution by the sorting controller comprise instructions for sorting the seeds corresponding to the plurality of images according to respective classification categories.

According to some embodiments of the invention, the clusterization is performed according to a target ratio of classification categories, wherein members of the clusters are arranged according to the target ratio.

According to some embodiments of the invention, the target ratio of classification categories is computed according to a DNA analysis of a sample of the seeds.

According to some embodiments of the invention, the respective classification categories comprise a binary indication of seed purity or seed impurity, wherein the plurality of images are clustered into a seed purity cluster indicative of seeds classified as pure, or into a seed impurity cluster indicative of seeds classified as impure.

According to some embodiments of the invention, the clusterization into the seed purity cluster or seed impurity cluster is performed according to a target statistical distribution.

According to some embodiments of the invention, the target statistical distribution is computed according to at least one of: a target true positive, a target true negative, a target false positive, a target false negative, a manually entered distribution, a distribution measured according to a DNA test performed on a sample of the seeds.

According to some embodiments of the invention, the instruction for the sorting controller include instructions for discarding the seeds classified as impure.

According to some embodiments of the invention, the training dataset stores an indication of a ratio of classification categories associated with the plurality of training images.

According to some embodiments of the invention, the seeds are isogenic.

According to some embodiments of the invention, the seeds are from a same mother but different paternal pollen and the clusters are computed according to the different paternal pollen.

According to some embodiments of the invention, the seeds include non-hybrid and hybrid seeds and the clusters are computed according to non-hybrid and hybrid indications.

According to some embodiments of the invention, the seeds include self-pollinated and hybrid seeds and the clusters are computed according to self-pollinated and hybrid indications.

According to some embodiments of the invention, the clusters of different classification categories are created for seeds are grown under same environmental conditions.

According to some embodiments of the invention, the clusters of different classification categories are created for seeds are grown at a same growing season.

According to some embodiments of the invention, the clusters of different classification categories are created for seeds are grown at a same geographical location.

According to some embodiments of the invention, the clusters of different classification categories are created for seeds having identical physical parameters within a tolerance range.

According to some embodiments of the invention, the physical parameters are selected from the group consisting of: color, texture, size, area, length, roundness, width, thousand seed weight, and combinations of the aforementioned.

According to some embodiments of the invention, the at least one image comprises a plurality of images including a plurality of seeds of different classification categories, wherein the at least one neural network computes an embedding for each of the plurality of images, wherein the embedding of the plurality of images are clustered by clusterization code, and wherein the instructions for execution by the sorting controller comprise instructions for sorting the seeds according to corresponding clusters.

According to some embodiments of the invention, the clusters are computed such that each embedded image member of each respective cluster is at least a threshold distance away from another cluster.

According to some embodiments of the invention, the clusters are computed such that each embedded image member of each respective cluster is less than a threshold distance away from every other member of the same respective cluster.

According to some embodiments of the invention, the intra-cluster distance computed between embeddings of a same cluster is less than an inter-cluster distance computed between embeddings of different clusters.

According to some embodiments of the invention, the seeds corresponding to embeddings located above an abnormality distance threshold from at least one of: another embedding, and a cluster, are denoted as abnormal and clustered into an abnormal cluster.

According to some embodiments of the invention, the seeds denoted as abnormal are assigned a new classification category according to classification categories assigned to at least two image embeddings and/or at least two clusters in proximity to the embedding of the seed denoted as abnormal.

According to some embodiments of the invention, the new classification category is computed according to relative distances to the at least two image embeddings and/or at least two clusters in proximity to the embedding of the seed denoted as abnormal.

According to some embodiments of the invention, the at least one statistical value is computed for each cluster, and wherein a certain seed is denoted as abnormal when the embedding of the image of the certain seed is statistically different from all other clusters.

According to some embodiments of the invention, the at least one statistical value is computed for each cluster, and wherein a certain seed is assigned a certain classification category of a certain cluster when the embedding of the image of the certain seed is statistically similar to at least one statistical value of the certain cluster.

According to some embodiments of the invention, the at least one statistical value of respective clusters is selected from the group consisting of: mean of the embedding of the respective cluster, variance of the embeddings of the respective cluster, and higher moments of the embeddings of the respective cluster.

According to some embodiments of the invention, the system further comprises providing an image of a target seed, computing the embedding of the target seed by the at least one neural network, and selecting a sub-set of the plurality of image embeddings according to image embedding located less than a target distance threshold away from the embedding of the target seed, wherein the instructions for execution by the sorting controller comprise instructions for selecting seeds corresponding to the sub-set of the plurality of image embeddings.

According to some embodiments of the invention, the system further comprises providing an image of a target seed, computing the embedding of the target seed by the at least one neural network, clustering the plurality of image embeddings and the embedding of the target seed, and selecting a cluster that includes the embedding of the target seed, wherein the instructions for execution by the sorting controller comprise instructions for selecting seeds corresponding to the selected cluster.

According to an aspect of some embodiments of the present invention there is provided a system for training at least one neural network for sorting of seeds, comprising:
a non-transitory memory having stored thereon a code for execution by at least one hardware processor, the code comprising:
code for accessing a training dataset comprising a plurality of training images of a plurality of seeds captured by at least one imaging sensor, wherein each respective training image of the plurality of training images is associated with an indication of at least one classification category of at least one seed depicted in the respective training image; and
code for training at least one neural network according to the training dataset, the at least one neural network trained for computing an indication of at least one classification category according to at least one target image comprising at least one seed captured by at least one imaging sensor,
wherein the indication of at least one classification category of the at least one target image is computed at least according to weights of the at least one trained neural network, wherein a trained non-neural network statistical classifier computes the at least one classification category with statistical insignificance according to at least one explicitly defined visual feature extracted from the at least one image based on at least one of a visual and a physical property of the at least one seed.

According to an aspect of some embodiments of the present invention there is provided a container comprising a plurality of seeds, wherein the seeds are identical with respect to a trait, a microbiome or a genome.

According to some embodiments of the invention, the plurality of seeds are sorted according to the system described herein.

According to some embodiments of the invention, the plurality of seeds comprises more than 1000 seeds.

According to some embodiments of the invention, the plurality of seeds weights more than 100 grams.

According to some embodiments of the invention, the trait is selected from the group consisting of increased nitrogen use efficiency, increased abiotic stress tolerance, increased biotic stress tolerance, increased biomass, increased growth rate, increased vigor, increased yield and increased fiber yield or quality, and increased oil.

According to an aspect of some embodiments of the present invention there is provided a method of growing a crop comprising seeding the seeds of the container described herein, thereby growing the crop.

According to some embodiments of the invention, the seeds are grown in an environment under stress conditions.

According to some embodiments of the invention, the stress conditions comprise abiotic stress tolerance or biotic stress tolerance.

According to an aspect of some embodiments of the present invention there is provided a system for sorting of seeds, comprising:
a non-transitory memory having stored thereon a code for execution by at least one hardware processor, the code comprising:
code for inputting into at least one neural network, at least one image including at least one seed, the at least one image captured by at least one imaging sensor;

code for computing by the at least one neural network, an indication of at least one classification category for the at least one seed selected from the group consisting of: hybrid, and non-hybrid, wherein the indication of at least one classification category is computed at least according to weights of the at least one neural network, wherein a trained non-neural network statistical classifier computes the at least one classification category with statistical insignificance according to at least one explicitly defined visual feature extracted from the at least one image based on at least one of a visual and a physical property of the at least one seed, wherein the at least one neural network is trained according to a training dataset comprising a plurality of training images of a plurality of seeds captured by the at least one imaging sensor, wherein each respective training image of the plurality of training images is associated with an indication of the at least one classification category of at least one seed depicted in the respective training image selected from the group consisting of: hybrid, and non-hybrid; and code for generating according to the indication of at least one classification category selected from the group consisting of: hybrid, and non-hybrid, instructions for execution by a sorting controller of an automated sorting device for automated sorting of seeds.

According to an aspect of some embodiments of the present invention there is provided a system for training at least one neural network for sorting of seeds, comprising:

a non-transitory memory having stored thereon a code for execution by at least one hardware processor, the code comprising:

code for accessing a training dataset comprising a plurality of training images of a plurality of seeds captured by at least one imaging sensor, wherein each respective training image of the plurality of training images is associated with an indication of at least one classification category of at least one seed depicted in the respective training image selected from the group consisting of: hybrid, and non-hybrid; and code for training at least one neural network according to the training dataset, the at least one neural network trained for computing an indication of at least one classification category selected from the group consisting of: hybrid, and non-hybrid according to at least one target image comprising at least one seed captured by at least one imaging sensor, wherein the indication of at least one classification category of the at least one target image is computed at least according to weights of the at least one trained neural network, wherein a trained non-neural network statistical classifier computes the at least one classification category with statistical insignificance according to at least one explicitly defined visual feature extracted from the at least one image based on at least one of a visual and a physical property of the at least one seed.

According to an aspect of some embodiments of the present invention there is provided a container comprising a plurality of seeds, wherein at least 90% of the seeds are hybrid seeds.

According to an aspect of some embodiments of the present invention there is provided a system for sorting of seeds, comprising:

a non-transitory memory having stored thereon a code for execution by at least one hardware processor, the code comprising:

code for inputting into at least one neural network, at least one image including at least one seed, the at least one image captured by at least one imaging sensor;

code for computing by the at least one neural network, an indication of at least one classification category for the at least one seed selected from the group consisting of: stress resistant, and non-stress resistant, wherein the indication of at least one classification category is computed at least according to weights of the at least one neural network, wherein a trained non-neural network statistical classifier computes the at least one classification category with statistical insignificance according to at least one explicitly defined visual feature extracted from the at least one image based on at least one of a visual and a physical property of the at least one seed, wherein the at least one neural network is trained according to a training dataset comprising a plurality of training images of a plurality of seeds captured by the at least one imaging sensor, wherein each respective training image of the plurality of training images is associated with an indication of the at least one classification category of at least one seed depicted in the respective training image selected from the group consisting of: stress resistant, and non-stress resistant; and code for generating according to the indication of at least one classification category selected from the group consisting of: stress resistant, and non-stress resistant, instructions for execution by a sorting controller of an automated sorting device for automated sorting of seeds.

According to some embodiments of the invention, the at least one image includes a plurality of seeds, wherein the trained non-neural network statistical classifier classifies the at least one image of the plurality of seeds into a same at least one classification category, according to the at least one visual feature, wherein the neural network classifiers the at least one image of the plurality of seeds with statistical significance into two classification categories including stress-resistant and non-stress resistant.

According to some embodiments of the invention, the stress is an abiotic stress.

According to some embodiments of the invention, the stress is a biotic stress.

According to an aspect of some embodiments of the present invention there is provided a system for training at least one neural network for sorting of seeds, comprising:

a non-transitory memory having stored thereon a code for execution by at least one hardware processor, the code comprising:

code for accessing a training dataset comprising a plurality of training images of a plurality of seeds captured by at least one imaging sensor, wherein each respective training image of the plurality of training images is and associated with an indication of at least one classification category of at least one seed depicted in the respective training image selected from the group consisting of: stress resistant and stress non-resistant; and code for training at least one neural network according to the training dataset, the at least one neural network trained for computing an indication of at least one classification category selected from the group consisting of: stress resistant and stress non-resistant according to at least one target image comprising at least one seed captured by at least one imaging sensor, wherein the indication of at least one classification category of the at least one target image is computed at least according to weights of the at least one trained neural network, wherein a trained non-neural network statistical classifier computes the at least one classification category with statistical insignificance according to at least one explicitly defined visual feature extracted from the at least one image based on at least one of a visual and a physical property of the at least one seed.

According to an aspect of some embodiments of the present invention there is provided a container comprising a plurality of seeds, wherein at least 90% of the seeds are stress-resistant seeds.

According to an aspect of some embodiments of the present invention there is provided a method of growing a crop comprising seeding the seeds of the container described herein, thereby growing the crop.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A-4E are dataflow diagrams of exemplary dataflows based on the methods described with reference to FIGS. 1 and/or 3, executable by components of system 200 described with reference to FIG. 2, in accordance with some embodiments of the present invention.

DESCRIPTION OF SPECIFIC EMBODIMENTS OF THE INVENTION

Figure 1:
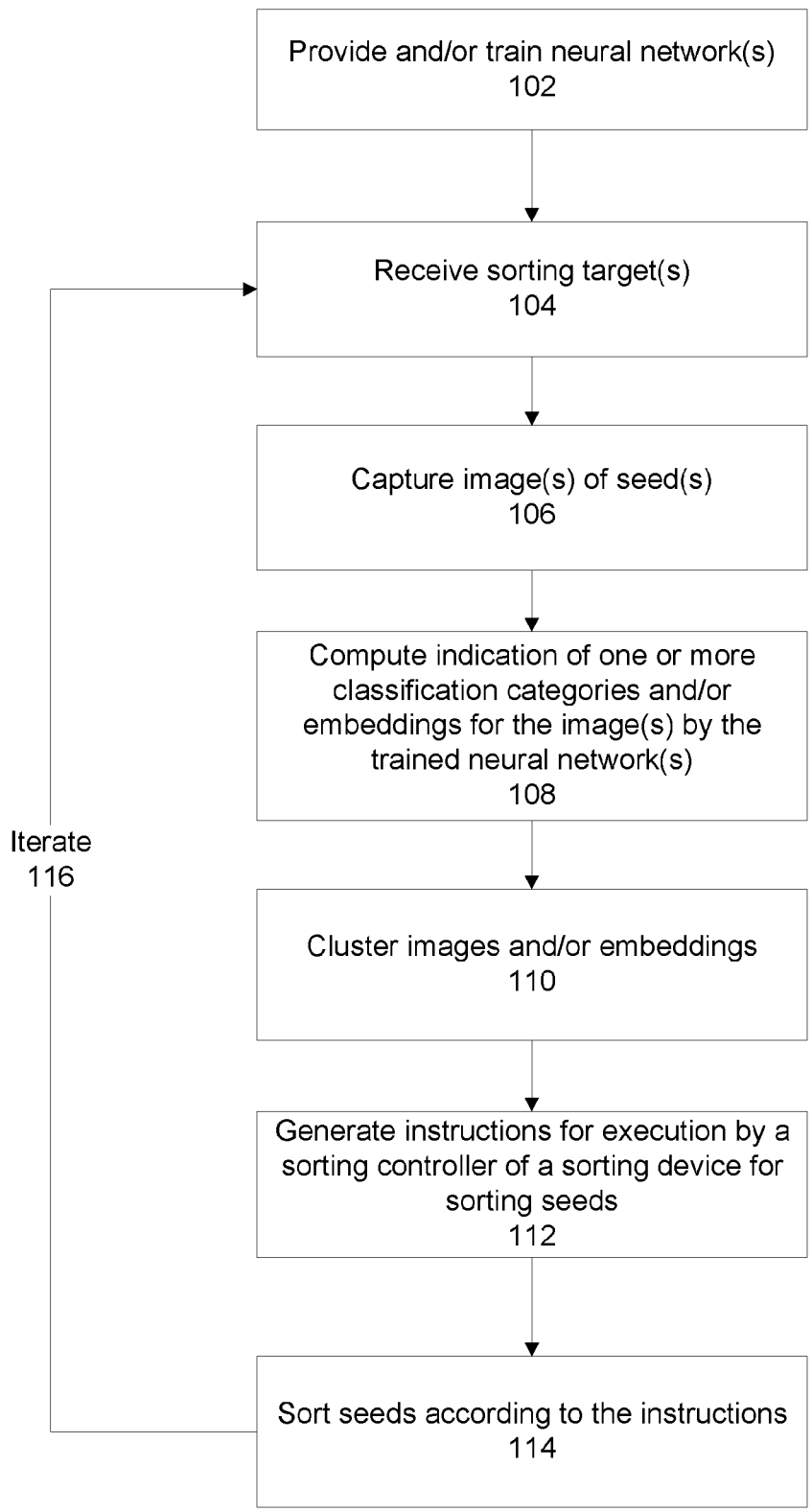
FIG. 1 is flowchart of a process for sorting seeds according to images of the seeds, in accordance with some embodiments of the present invention.

The present invention, in some embodiments thereof, relates to seed analysis and, more specifically, but not exclusively, to systems and methods for sorting of seeds.

An aspect of some embodiments of the present invention relates to systems, methods, an apparatus, and/or code instructions for automated classification of seeds, optionally automated sorting of seeds according to the classification. The classification of seeds may refer to clustering of seeds having similar classification categories. Images, each one including one or more seeds, are inputted into one or more neural networks. Optionally, images are segmented such that each image includes a single seed. The neural network(s) compute an indication of one or more classification categories for each seed depicted in the image(s), optionally at least according to weights and/or architecture of the trained neural network. In some implementations, traditional features such as visual features based on one or more physical properties of the seeds are not explicitly defined for extraction by the neural network described herein. Such traditional (e.g., visual) features may be identified automatically by the neural network during training in an implicit manner, for example, implied by the weights and/or architecture of the neural network. However, the neural network is not explicitly programmed to explicitly extract defined visual features. In contrast, such traditional features are explicitly defined and extracted from the images by non-neural network statistical classifiers, for example, linear classifiers, support vector machines, k-nearest neighbors, and decision trees. Examples of visual features based on one or more physical properties of the seed extracted from images of the seed(s) by non-neural network statistical classifiers, include, hand-crafted features, size dimension(s) of the seed, color of the seed, shape of the seed, texture of the seed, combinations of the aforementioned, and the like. The trained non-neural network statistical classifiers cannot compute the classification category for the seed with statistical significance (i.e., compute the classification category with statistical insignificance, for example, the probability indicating accuracy of the classification result performed by the non-neural network statistical classifier is below a predefined threshold (e.g., below about 20%, or 50%, or 70%, or 90%, or other values), for example practically irrelevant for physical sorting of the seeds due to the inaccuracy of the classification) according to the extracted explicitly defined visual features alone when the seeds are similar visually and/or have similar physical characteristics. For example, when the image includes two or more seeds which are very similar visually and/or physically to one another, the trained neural network described herein is able to classify (with statistical significance, e.g., above a threshold) the images of the seeds into different classification categories according to stored weights of the trained neural network. In contrast, the trained non-neural network statistical classifier cannot classify the images of the seeds into two different classification categories with statistical significance based on the extracted visual features. For example, the non-neural network statistical classifier may classify the images of the seeds into the same classification category according to the extracted visual features. Visual feature(s) extracted from one image of one seed are statistically similar (e.g., within a tolerance threshold) to corresponding visual feature(s) extracted from another image of another seed when the seeds are visually and/or physically similar. For example, the seeds are of the same size and/or same color and/or same texture. The classification performed by the trained neural network is at least according to one or more classification categories that represent differences between the seeds for which visual features are not explicitly defined, for example, predicted phenotype, and/or difference is a genetic trait between isogenic seeds. It is noted that in some implementations, the neural network may extract and use such traditional visual features along with non-traditional and even non-explained, specialized feature. Such non-traditional and non-explained specialized features are automatically learned by the neural network, but cannot be learned and/or extracted by non-neural network statistical classifiers. Instructions for execution by a sorting controller of an automated sorting device may be created according to the computed indication of classification categories. For example, seeds are sorted according to classification categories, such that seeds of a same sorted cluster have the same classification category.

The neural network described herein computes the classification categories with relatively higher accuracy and/or higher statistical certainty in comparison to non-neural network statistical classifiers that extract explicitly defined visual features.

Seeds are sorted according to clusters and/or embeddings based on output of the neural network described herein, with relatively higher accuracy and/or higher statistical certainty in comparison to non-neural network statistical classifiers that extract explicitly defined visual features.

Inventors discovered that neural networks, trained on images of seeds that are visually and/or physically indistinguishable to non-neural network statistical classifiers extracting explicitly defined visual features (e.g., size, shape, color, texture), are able to differentiate between the seed images (e.g., compute classification categories thereof and/or create clusters), for example, according to predicted classification categories (e.g., phenotype that will be apparent at a future time interval) and/or small genetic differences (e.g., isogenic seeds) that are not expressed in the seed in a manner for which visual features may be extracted for classification by non-neural network statistical classifiers. Inventors discovered that during training, the neural network automatically computes its weights, which enable the neural network to automatically learn and/or discover previously unknown features and/or features which are not necessarily directly correlated to visual and/or physical properties of the seeds. Such automatically discovered features, which are not available to non-neural network statistical classifiers, enable the neural network to differentiate between images of seeds that are otherwise visually and/or physically similar. Experimental support of inventor's discovery is provided in the "Examples" section below.

Optionally, the image includes multiple seeds that are different from one another within a tolerance range by a single feature that is not explicitly expressed visually and/or physically by the seed, for example, predicted phenotype. The single feature cannot be extracted only according to visual feature(s) extracted by non-neural network statistical classifiers. For seeds that are similar visually and/or physically, the non-neural network statistical classifiers classify the images of the multiple seeds into a same classification category, and/or cannot classify the images of the seeds (e.g., output error or statistically insignificant category, since the single feature cannot be extracted only by the at least one visual features). The images of the seeds may be clustered according to the classification categories and/or embeddings outputted by the neural network. The classification category may be a binary classification category indicating whether the respective seed includes the single feature or does not include the single feature. Exemplary binary classification categories indicative of the single feature or lack thereof include: self pollinated or hybrid pollinated (i.e., non-self pollinated), resistant to stress or non-resistant to stress, hybrid or non-hybrid, genetically modified or non-genetically modified, isogenic seeds that are different from one another according to a single feature, and seeds of a shared mother that are different from one another by the paternal pollen. The instructions for sorting are generated according to the clusters, to sort the seeds according to the clusters.

Optionally, the seeds cannot be differentiated from one another based on manual visual observation, and/or based on visual features such as size and color.

Optionally, the seeds cannot be differentiated from one another by a non-neural network statistical classifier only according to extracted visual features based on physical characteristics, for example, size, color, texture.

Optionally, the seeds are grown under the same (or similar) environmental conditions, such as during the same growing season, at the same geographical location (e.g., same field, same greenhouse), and/or the same temperature.

Optionally, the images corresponding to the seeds are classified according to classification categories that are determined during a training phase for training the neural network. The training set of seeds should be of a known classification type. In one embodiment, the classification type is identified following tests that are destructive to the training set seeds, after images of the seeds are captured. The training is performed using images of the intact (and preferably viable) training seeds. The viable seeds are classified non-invasively by the trained neural network based on images of the training seeds.

At least some of the systems, methods, apparatus, and/or code instructions described herein address the technical problem of creating a seed lot of a target purity level. A produced seed batch containing self-pollinated seeds above a target amount is undesired, since the self-pollinated seeds represent impurity, which is undesired. Seed producers heavily utilize resources to ensure cross pollinations are not occurring, so as to reach the target seed purity. At least some of the systems, methods, apparatus, and/or code instructions described herein provide a technical solution to the technical problem by performing an analysis of images of the seeds, to non-invasively determine the purity level of the seed lot. Impure seeds may be detected and removed according to the analysis of their image.

At least some of the systems, methods, apparatus, and/or code instructions described herein address the technical problem of reducing or avoiding destructive testing of seeds, for example, to determine an estimated purity level of the seeds, and/or an estimated distribution of seed according to desired traits. Using traditional methods, quality assurance (QA) destructive DNA tests are performed in order to prove seed lot purity, for example, protein based methods for QA and/or enzyme-linked immunosorbent assay (ELISA). Such destructive testing destroys a portion of the seed lot, and therefore cannot be directly used to sort the seeds which were destroyed. Since a sample of seeds is tested rather than testing all (or most) of the seeds of the lot, the sample only represents an estimate of the full lot. Moreover, testing of the sample is time consuming. At least some of the systems, methods, apparatus, and/or code instructions described herein provide a technical solution to the technical problem by performing an analysis of images of the seeds to determine the classification category of the seed. The analysis of the image of the seed avoids destructively testing sample seeds from a batch of seeds.

At least some of the systems, methods, apparatus, and/or code instructions described herein address the technical problem of quickly and/or efficiently determining the classification category of seeds, such as desired traits. Using traditional methods, a seed breeder wishing to produce new breeds performs many cross pollinations between different seeds. During the process the produced seeds may or may not inherit the required traits. The seed breeder may use DNA tests in order to find which seed contain which trait, or grow the seeds and find out what plant/fruit each seed produces. When the DNA test is destructive for the seed, another option is to grow the seeds, for example, wait a month until leaves are emerging and send leaves to the DNA tests. The seed breeder selects desired seeds and continues with them to the next growing season, a process which may take up to 10 years until stabilizing a new commercial breed. Moreover, another technical problem is that many desired plant traits do not have DNA markers, for example some viruses require a phytopathology test in order to selects the seeds which contain resistance to the virus, or a germination ratio which requires germinating the seeds in order to determine the germination ratio. Other traits such as fruit taste, size and the like, also doesn't have DNA markers. The seed breeder may grow the seeds for a whole generation only to uncover that the seeds are not of the desired trait. At least some of the systems, methods, apparatus, and/or code instructions described herein provide a technical solution to the technical problem by performing an analysis of images of the seeds to determine the classification category of the seeds, such as desired traits. The analysis of the images provides real-time results, without requiring growing the seeds.

At least some of the systems, methods, apparatus, and/or code instructions described herein address the technical problem of quickly and/or efficiently determining the phenotype (i.e., classification category) of seeds. Phenotype of an organism (i.e., plant, seed) is the composite of observable traits and characteristics. Phenotype in general is affected by the genetics and also the environment in an unknown relationship. There is a connection between the phenotype and the genotype of the seed. There is a genotype and thus phenotype connection between the seed and the parental plants/fruit that produce the seed. There is a genotype and thus phenotype connection between the seed and the plant/fruit that will grow from the seed. There is a connection between the seed phenotype and the environment conditions in which the seed was grown. Even knowing one or more of the genotype, growth environment conditions, and parent plant/fruit, the phenotype of the seed is difficult to predict using standard methods. Moreover, seeds having similar genotypes, grown under the same environmental conditions, and originating from the same parent, may express different phenotypes. At least some of the systems, methods, apparatus, and/or code instructions described herein provide a technical solution to the technical problem by performing an analysis of images of the seeds to predict the phenotype of the seed, and/or may differentiate between seeds having different predicted phenotypes even when the seeds have similar genotypes, are grown under the same environmental conditions, and/or originate from the same parent.

At least some of the systems, methods, apparatus, and/or code instructions described herein address the technical problem of quickly and/or efficiently differentiating between isogenic seeds (e.g., classifying each seed of the isogenic seeds into a respective classification category, and/or clustering the isogenic seeds). Isogenic seeds are pair of seeds which almost identical despite a single (observable) trait. Their genetic similarity is at least about 99%. The main (sometimes only) difference between the isogenic seeds is a specific trait, for example, a virus resistance which may be affected by a single gene difference between the pair or the fruit size which may be affected by multiple genes difference between the pairs. Using standard methods, isogenic seeds are difficult to separate according to the single trait, such as into seeds with the single trait and seeds without the single trait. The genetic difference between isogenic seeds is very small and almost doesn't exist, making it difficult to detect using standard methods. Moreover, it is not likely that the small genetic difference between the isogenic seeds will be expressed as distinct phenotypical differences. Therefore, even if the genetic difference is detected using standard methods, predicting phenotypical difference based on the genetic difference is difficult. At least some of the systems, methods, apparatus, and/or code instructions described herein provide a technical solution to the technical problem by performing an analysis of images of the seeds to predict whether the seed has the trait or does not have the trait, and/or clustering seeds according to one cluster which has the trait and another cluster which does not have the trait.

At least some of the systems, methods, apparatus, and/or code instructions described herein address the technical problem of quickly and/or efficiently differentiating between seeds of a shared (i.e., same) mother (e.g., classifying each seed of the shared mother into a respective classification category, and/or clustering the seeds from the shared mother). The outer cover tissue of the seed comes entirely from the mother plant (e.g., from the fruit). Therefore, two or more seeds grown in two or more fruits of the same mother plant are expected to look identical despite a different paternal pollens, making differentiating between the seeds based on manual visual methods (e.g., by an expert seed grower) difficult or impossible. Moreover, self-pollinated and hybrid seeds are expected to look identical, since the seeds were grown in the fruits of the same mother plant, making differentiating between the seeds based on manual visual methods (e.g., by an expert seed grower) difficult or impossible. At least some of the systems, methods, apparatus, and/or code instructions described herein provide a technical solution to the technical problem by performing an analysis of images of the seeds to differentiate between seeds of the same mother, for example, classifying each seed of the shared mother into a respective classification category, and/or clustering the seeds from the shared mother into respective clusters based on classification categories.

At least some of the systems, methods, apparatus, and/or code instructions described herein address the technical problem of quickly and/or efficiently differentiating between seeds grown under the same environmental conditions and/or same geographic location. For example, classifying each seed into a respective classification category, and/or clustering the seeds into clusters. Plants have a remarkable ability to alter their phenotype according to environmental conditions. Inventors believe that a crucial component of the seed phenotype will be due to the environment conditions during the development of the seed and not the genetics of the seed. Therefore, using standard methods, classifying and/or clustering seeds under the same environmental conditions and/or same geographic location according to classification category, optionally phenotype, is difficult or impossible. At least some of the systems, methods, apparatus, and/or code instructions described herein provide a technical solution to the technical problem by performing an analysis of images of the seeds to differentiate between seeds grown under the same environmental conditions and/or same geographic location. For example, classifying each seed into a respective classification category (e.g., based on predicted phenotype), and/or clustering the seeds into respective clusters based on classification categories (e.g., predicted phenotype).

At least some of the systems, methods, apparatus, and/or code instructions described herein improve the technical field of automated sorting of seeds. Traditional machines for sorting of seeds are based on physical properties of the seeds, for example, a gravity table that sorts seeds based on weights. Sorting machines based on optical methods still rely on visual properties of the seeds based on physical properties, for example, size, color, shape, and texture. Traditional sorting machines may indirectly ensure homogeneous physical properties of seeds (e.g., size, shape, color) by removing dirt, foreign materials, broken seeds, and misshapen seeds. None of the traditional sorting machines analyze seeds to estimate phenotypical properties of seeds such as vigor and/or germination rates. Vigor and/or germination rates are raised indirectly and/or are indirectly evaluated, for example, for corn by removing black kernels that will not germinate. Removing the black kernels indirectly raises the germination rates. The other remaining kernels are not analyzed to predict their germination rates. Moreover, removing foreign seeds, abnormal seeds, and/or other foreign material (e.g., dirt) is based on significantly different visual appearance than the desired seeds, for example, significantly different size, shape, and/or color. Furthermore, the only sorting machine known to inventors that is able to separate self pollinated seeds from hybrid seeds (i.e., Brimrose SeedMeister AOTF-NIR Analyzer) is designed only for seedless watermelons, where the self pollinated and hybrid seeds are significantly different in terms of genetics (i.e., triploid versus haploid) which is expressed in terms of significant differences in terms of seed size. Therefore, the differentiation between self pollinated and hybrid seeds is performed indirectly based on seed size. In contrast, at least some of the systems, methods, apparatus, and/or code instructions described herein generate instruction for automated sorting of seeds (e.g., according to classification category and/or by clustering) that look visually identical and/or have identical physical properties (e.g., within a tolerance), for example, that would be considered as being identical by a user manually looking at the seeds, and/or when analyzed by non-neural network statistical classifiers based on explicitly defined features extracted according to visual and/or physical properties, and/or that when processed by standard machines based on physical and/or visual properties would be sorted in the same manner (e.g., all seeds removed or all seeds maintained in the same batch). For example, seeds that are classified and/or clustered (within a tolerance, but not differentiable by manual visual methods and/or standard image processing methods based on extracted visual features) by at least some of the systems, methods, apparatus, and/or code instructions described herein include seeds of similar: color, texture, thousand seed weight, grow under same environment conditions, grown during the same season, grown at the same geographic location. It is noted that seeds grown in the same field and/or same greenhouse, or in a nearby fields, within the tolerance range, are considered as being at the same geographic location and/or grown under the same environment conditions.

At least some of the systems, methods, apparatus, and/or code instructions described herein improve the technical field of predicting seed germination. Using standard methods, for example, CF analyzer y SEQSO, seed germination is predicted based on a measurement of an amount of chlorophyll according to a Washington university academic paper. The method only works on specific crops. In contrast, at least some of the systems, methods, apparatus, and/or code instructions described herein predict germination of the seed according to an analysis of the image of the seed, regardless of whether the seed has chlorophyll or not, and does not directly estimate the amount of chlorophyll.

Some exemplary previous processes are now described, to help understand the improvement to the technical field of classification of seeds provided by at least some of the systems, methods, apparatus, and/or code instructions described herein. It is noted that none of the previous methods utilize neural networks, which automatically learn previously unknown (and/or unexplained) features from images of the seeds, which are different than classical visual features extracted from images based on visual and/or physical properties of the seeds such as color, size, and texture. Moreover, none of the previous methods are able to differentiate between seeds that are similar to one another (e.g., same mother, same geographical location within a tolerance range, same environmental conditions within a tolerance range, and/or isogenic seeds).

"Classification of different tomato seed cultivars by multispectral visible-near infrared spectroscopy and chemometrics" by Santosh Shrestha, Lise Christina Deleuran and René Gislum, appears to relate to using a multispectral camera to capture images that are analyzed using classical methods, in which visually distinct features based on physical properties of the seeds are extracted. For example, color and size. The authors used 5 different tomato cultivars which do not appear to have any particular genetic relations between them, making them very different genetically wise, and very different physically and/or visually wise, and therefore easy to differentiate using standard methods based on visual extracted features.

"Use of Multispectral Imaging in Varietal Identification of Tomato"—Santosh Shrestha, Lise Christina Deleuran, Merete Halkjœt Olesen, and René Gislum, appears to relate to using a multispectral camera to capture images that are analyzed using classical methods, in which visually distinct features based on physical properties of the seeds are extracted. For example, color and size. Moreover, the pairs of self pollinated and hybrid seeds may have been grown under different environment conditions, which result in visually significant phenotypical differences which are easy to detect using standard methods.

"Discrimination of haploid and diploid maize kernels via multispectral imaging" appears to relate to using a multispectral camera to capture images that are analyzed using classical methods, in which visually distinct features based on physical properties of the seeds are extracted. For example, color and size. The classification accuracy was about 50%, which is impractical for industrial sorting applications.

At least some of the systems, methods, apparatus, and/or code instructions described herein improve the technical field of automated classification and/or automated sorting of seeds. The automated classification and/or automated sorting is not based on a simple coding of an existing manual process onto a computer. Rather, at least some systems, methods, apparatus, and/or code instructions described herein turn a subjective method into an objective, reproducible method based on the trained neural network code described herein. Inventors developed new steps that did not previously exist in the manual process, and do have not counterparts in the manual process, namely, training of the neural network code, and/or execution of the trained neural network code to automatically classify and/or cluster images of seeds. At least the trained neural network code described herein provides objective, reproducible classification and/or clustering results, which are not available using standard manual processes. Moreover, as described herein, in cases where the seeds are visually indistinguishable from each other to a user, the automated processes described herein are able to perform classification and/or clusterization which cannot be performed manually.

The term "seed" refers to a seed of a plant which is a complete self-contained reproductive unit generally consisting of a zygotic embryo resulting from sexual fertilization or through asexual seed reproduction (apomixis), storage reserves of nutrients in structures referred to as cotyledons, endosperm or megagametophytes, and a protective seed coat encompassing the storage reserves and embryo.

The seeds which are undergoing categorization according to embodiments of the present invention are typically viable—i.e. capable of germinating, although in some cases categorization of non-viable seeds is also contemplated, as further described herein below.

Germination of sexual zygotic and apomictic plant seeds is generally triggered by one or more environmental cues such as the presence of water, oxygen, optimal temperature or cold/hot treatment, and exposure to light and its duration. Seeds germinate by means of a series of events which commence with the uptake of water (imbibition) by a quiescent dry seed and then subsequently proceed through various biophysical, biochemical and physiological events which ultimately result in the elongation of the embryo along its axis and development of the offspring.

The continuous process of seed germination may be divided into three phases. Phase one is referred to as imbibition and is characterized by a rapid initial intake of water into the seed. Other significant events occurring in phase one are the initiation of repair of damage nuclear and mitochondrial DNA, which may have occurred during seed desiccation and/or the maturation process, and subsequent commencement of protein synthesis facilitated by existing mRNA.

Phase two is characterized by a significant reduction in the rate of water uptake (i.e., imbibition has been completed). This is accompanied by activation or de novo synthesis of enzymes that specialize in hydrolyzing the complex storage reserves of carbohydrates, proteins, and lipids in the embryo and the cotyledons or megagametophytes. The hydrolysis of these complex storage reserves provides the substrates required for the respiration and growth of the seed embryos.

Phase three is characterized by a second rapid increase in the rate of water uptake. Water absorbed during phase three is used primarily for the initiation of meristematic cell division at the root and shoot apices of the embryo, and for uptake into the cells along the embryonal axis. Water taken up by the axial cells of the embryo applies turgor pressure which results in axial cell elongation. The net effect is that the embryo elongates to the point of emergence through the seed coat. Protrusion of a shoot or root radicle through the seed coat signifies the completion of germination and the onset of seedling growth and development.

The term "plant" as used herein encompasses a whole plant, a grafted plant, ancestor(s) and progeny of the plants. The plant may be in any form including suspension cultures, embryos, meristematic regions, callus tissue, leaves, gametophytes, sporophytes, pollen, and microspores.

The seeds which are categorized according to the present invention may be derived from any plant, for e.g. those belonging to the superfamily Viridiplantae, in particular monocotyledonous and dicotyledonous plants including a fodder or forage legume, ornamental plant, food crop, tree, or shrub selected from the list comprising *Acacia* spp., *Acer* spp., *Actinidia* spp., *Aesculus* spp., *Agathis australis*, *Albizia amara*, *Alsophila tricolor*, *Andropogon* spp., *Arachis* spp, *Areca catechu*, *Astelia fragrans*, *Astragalus cicer*, *Baikiaea plurijuga*, *Betula* spp., *Brassica* spp., *Bruguiera gymnorrhiza*, *Burkea africana*, *Butea frondosa*, *Cadaba farinosa*, *Calliandra* spp, *Camellia sinensis*, *Canna indica*, *Capsicum* spp., *Cassia* spp., *Centroema pubescens*, *Chacoomeles* spp., *Cinnamomum cassia*, *Coffea arabica*, *Colophospermum mopane*, *Coronillia varia*, *Cotoneaster serotina*, *Crataegus* spp., *Cucumis* spp., *Cupressus* spp., *Cyathea dealbata*, *Cydonia oblonga*, *Cryptomeria japonica*, *Cymbopogon* spp., *Cynthea dealbata*, *Cydonia oblonga*, *Dalbergia monetaria*, *Davallia divaricata*, *Desmodium* spp., *Dicksonia squarosa*, *Dibeteropogon amplectens*, *Dioclea* spp, *Dolichos* spp., *Dorycnium rectum*, *Echinochloa pyramidalis*, *Ehraffia* spp., *Eleusine coracana*, *Eragrestis* spp., *Erythrina* spp., *Eucalypfus* spp., *Euclea schimperi*, *Eulalia vi/losa*, *Pagopyrum* spp., *Feijoa sellowlana*, *Fragaria* spp., *Flemingia* spp, *Freycinetia banksli*, *Geranium thunbergii*, *GinAgo biloba*, *Glycine javanica*, *Gliricidia* spp, *Gossypium hirsutum*, *Grevillea* spp., *Guibourtia coleosperma*, *Hedysarum* spp., *Hemafhia altissima*, *Heteropogon contoffus*, *Hordeum vulgare*, *Hyparrhenia rufa*, *Hypericum erectum*, *Hypeffhelia dissolute*, *Indigo incamata*, *Iris* spp., *Leptarrhena pyrolifolia*, *Lespediza* spp., *Lettuca* spp., *Leucaena leucocephala*, *Loudetia simplex*, *Lotonus bainesli*, *Lotus* spp., *Macrotyloma axillare*, *Malus* spp., *Manihot esculenta*, *Medicago saliva*, *Metasequoia glyptostroboides*, *Musa sapientum*, *Nicotianum* spp., *Onobrychis* spp., *Ornithopus* spp., *Oryza* spp., *Peltophorum africanum*, *Pennisetum* spp., *Persea gratissima*, *Petunia* spp., *Phaseolus* spp., *Phoenix canariensis*, *Phormium cookianum*, *Photinia* spp., *Picea glauca*, *Pinus* spp., *Pisum sativam*, *Podocarpus totara*, *Pogonarthria fleckii*, *Pogonaffhria squarrosa*, *Populus* spp., *Prosopis cineraria*, *Pseudotsuga menziesii*, *Pterolobium stellatum*, *Pyrus communis*, *Quercus* spp., *Rhaphiolepsis umbellata*, *Rhopalostylis sapida*, *Rhus natalensis*, *Ribes grossularia*, *Ribes* spp., *Robinia pseudoacacia*, *Rosa* spp., *Rubus* spp., *Salix* spp., *Schyzachyrium sanguineum*, *Sciadopitys vefficillata*, *Sequoia sempervirens*, *Sequoiadendron giganteum*, *Sorghum bicolor*, *Spinacia* spp., *Sporobolus fimbriatus*, *Stiburus alopecuroides*, *Stylosanthos humilis*, *Tadehagi* spp, *Taxodium distichum*, *Themeda triandra*, *Trifolium* spp., *Triticum* spp., *Tsuga heterophylla*, *Vaccinium* spp., *Vicia* spp., *Vitis vinifera*, *Watsonia pyramidata*, *Zantedeschia aethiopica*, *Zea mays*, amaranth, artichoke, asparagus, broccoli, Brussels sprouts, cabbage, canola, carrot, cauliflower, celery, collard greens, flax, kale, lentil, oilseed rape, okra, onion, potato, rice, soybean, straw, sugar beet, sugar cane, sunflower, tomato, squash tea, maize, wheat, barley, rye, oat, peanut, pea, lentil and alfalfa, cotton, rapeseed, canola, pepper, sunflower, tobacco, eggplant, eucalyptus, a tree, an ornamental plant, a perennial grass and a forage crop. Alternatively algae and other non-Viridiplantae can be used for the methods of the present invention.

According to some embodiments of the invention, the seeds are derived from a crop plant such as rice, maize (corn), wheat, barley, peanut, potato, sesame, olive tree, palm oil, banana, soybean, sunflower, canola, sugarcane, alfalfa, millet, leguminosae (bean, pea), flax, lupinus, rapeseed, tobacco, poplar and cotton.

According to a particular embodiment, the seeds are corn seeds.

According to some embodiments of the invention the seeds are derived from a dicotyledonous plant.

According to some embodiments of the invention the seeds are derived from a monocotyledonous plant.

In nature, maturation of plant seeds is usually accompanied by gradual loss of water over a period of time to levels between 5-35% moisture content. Once these low moisture levels are achieved, plant seeds can be stored for extended periods.

Thus, in one embodiment, the seed is a dried seed. The appropriate conditions (temperature, relative humidity, and time) for the drying process will vary depending on the seed and can be determined empirically (see, for example, Jeller et al. 2003. ibid).

The seed of the present invention may also be a primed seed.

Any method for seeds priming as is known to a person skilled in the art can be used according to the teachings of the present invention. Priming can be performed under a variety of temperatures and aeration (e.g., stirring, agitation, bubbling, etc.) using any of the techniques for controlled water uptake: priming with solutions (inorganic, e.g., salts/nutrients, or organic, e.g., PEG) or with solid particulate systems or by controlled hydration with water as described, for example, in Taylor, A G. et al 1998. Seed Science Technology 8:245-256).

A priming matrix is characterized by its effective osmotic potential. An effective osmotic potential typically lowers the water potential available for seed imbibitions allowing or causing a limited amount of water to move into the seed to a level sufficient for initial steps of germination without actual protrusion of the radical, i.e., to prime the seed. Seeds germination occurs only when water available to the seed reaches a potential sufficient for physiological development, which varies between plant species. Typically this value falls between 0 and −2 mPa. Many priming matrices that provide an appropriate osmotic potential are being used, including water, water with one or more solutes, solid matrices, and the like. For example, the priming matrix may comprise an aerated solution of osmotic material, of organic nature such as polyethylene glycol (PEG) (see U.S. Pat. No. 5,119,598), glycerol, mannitol, or inorganic salt (or combination of salts) such as potassium phosphate, potassium nitrate, and the like. Alternatively, seeds may be primed using a solid matrix. A solid matrix material should have a high water holding capacity to allow seeds to imbibe. In this method, the priming matrix can comprise an absorbent medium such as clay, vermiculite, perlite, saw dust, corn cobs, and/or peat to absorb water and then transfer it to the seed (e.g., U.S. Pat. No. 4,912,874). The extent of hydration is controlled by altering the water content of the medium and the medium/seed ratio. Methods are also known to imbibe seeds in a slurry of PEG 6000 and vermiculite, or other matrices (e.g., U.S. Pat. No. 5,628,144). In still other methods, priming employs a semi-permeable membrane that mediates the transfer of water from a solution characterized by a given osmotic pressure to the seed (e.g., U.S. Pat. No. 5,873,197). In other methods, ultrasonic energy can be used to assist in the priming process (e.g., U.S. Pat. No. 6,453,609). Optionally a variety of additives, chemicals, and/or compounds can be included in the priming matrix, including surfactants, selective agents, fungicides, agents to modify osmotic potential, osmotic protectants, agents to aid drying or protect the seed during drying, agents to enhance seed processing, agents to extend storage shelf-life, agents to enhance coating and/or perfusion, agents to enhance germination of the seed, and the like. Fungicides can be included in the priming matrix, for example, thiram, captan, metalaxyl, pentachloronitrobenzene, fenaminosulf, bactericides or other preservatives. In addition, various growth regulators or hormones, such as gibberellins or gibberellic acid, cytokinins, inhibitors of abscissic acid, 2-(3,4-dichlorophenoxy) triethylamine (DCPTA), potassium nitrate, and ethaphon can also be present in the priming matrix. Other optional agents include glycerol, polyethylene glycol, mannitol, DMSO, Triton X-100, Tween-20, NP-40, ionic compounds, non-ionic compounds, surfactants, detergents, and the like. A time sufficient to produce a primed seed allows pre-germinative metabolic processes to take place within the seed up to any level including that immediately preceding radicle-emergence. The time to produce a primed seed is dependent on the specific seed variety, its state or condition, and the water potential of the priming matrix. While typical water amounts and media water potentials for given seed types are already generally known for some seeds, it is frequently best to test a small sample of a new seed over a readily determined range of osmotic potentials and temperatures to determine what conditions of temperature, water potential, and time provide appropriate imbibing of the seed and resultant pre-germination events. The temperature at which the priming methods are carried out may vary with the seeds to be treated, but typically is between 18° C. to 30° C. The primed seeds may be retained in the priming matrix through germination as denoted by radical emergence. Seed produced by this method may be further dried (e.g., as in U.S. Pat. No. 4,905,411).

The seeds which are classified according to embodiments of the present invention may be derived from cultivated plants.

The term "cultivated plants" refers to plants which have been modified by breeding, mutagenesis or genetic engineering.

Plants modified by breeding:

Classical or conventional plant breeding. This involves the deliberate interbreeding (crossing) of closely or distantly related plants, resulting in new varieties with desirable properties.

Backcrossing or introgression breeding. In this process, a plant that has the desirable trait—is crossed with a plant that doesn't have that trait, but is desirable in all other traits. There is a quality control step to make sure that the only change to the original variety is the desired trait. The next generation plant is called the progeny, as further defined herein below. This is repeated several times, always crossing back to the high-yielding parent or parent with the desired trait, and selecting the progeny with the desired trait. This process ensures the next generation is in most ways similar to the high-yielding parent while adding the trait from the other parent.

As used herein, the phrase "progeny plant" refers to any plant resulting as progeny from a vegetative or sexual reproduction from one or more parent plants or descendants thereof. For instance, a progeny plant can be obtained by cloning or selfing of a parent plant or by crossing two parental plants and include selfings as well as the F1 or F2 or still further generations. An F1 is a first-generation progeny produced from parents at least one of which is used for the first time as donor of a trait, while progeny of second generation (F2) or subsequent generations (F3, F4, and the like) are specimens produced from selfings, intercrosses, backcrosses, or other crosses of F1s, F2s, and the like. An F1 can thus be (and in some embodiments is) a hybrid resulting from a cross between two true breeding parents (i.e., parents that are true-breeding are each homozygous for a trait of interest or an allele thereof, e.g., in this case male sterile having long stigma as described herein and a restorer line), while an F2 can be (and in some embodiments is) a progeny resulting from self-pollination of the F1 hybrids.

Inbreeding. Depending on the species, some plants may be fertilized by themselves. This is done to produce an inbred variety, which it is exactly the same generation after generation.

Hybrid breeding. In this situation, two different inbred varieties are crossed to produce an offspring with stable characteristics and hybrid vigor, where the offspring is much more productive than either parent.

As used herein, the term "hybrid seed" is a seed produced by cross-pollinating two plants. Plants grown from hybrid seed may have improved agricultural characteristics, such as better yield, greater uniformity, and/or disease resistance. Hybrid seeds do not breed true, i.e., the seed produced by self-fertilizing a hybrid plant (the plant grown from a hybrid seed) does not reliably result the next generation in an identical hybrid plant. Therefore, new hybrid seeds must be produced from the parent plant lines for each planting. Since most crop plants have both male and female organs, hybrid seeds can only be produced by preventing self-pollination of the female parent and allowing or facilitating pollination with the desired pollen. There are a variety of methods to prevent self-pollination of the female parent, one method by which self-pollination is prevented is mechanical removal of the pollen producing organ before pollen shed. Commercial hybrid maize seed (maize, Zea mays) production typically involves planting the desired male and female parental lines, usually in separate rows or blocks in an isolated field, treating the female parent plant to prevent pollen shed, ensuring pollination of the female by only the designated male parent, and harvesting hybrid seed from only the female parent. Hybrid seeds may be the result of a single cross (e.g., a first generation cross between two inbred lines), a modified single cross (e.g., a first generation cross between two inbred lines, one or other of which may have been modified slightly by the use of closely related crossing), a double cross (e.g., a first generation of a cross between two single crosses), a three-way cross (e.g., a first generation of a cross between a single cross and an inbred line), a top cross (e.g., the first generation of a cross between an inbred line and an open-pollinated variety, or the first generation of a cross between a single-cross and an open-pollinated variety), or an open pollinated variety (e.g., a population of plants selected to a standard which may show variation but has characteristics by which a variety can be differentiated from other varieties).

Plants Modified by Mutation Breeding

The mutations may be due to naturally causes or artificially encouraged by exposing plants to chemicals or radiation Genetically Modified Plants The classification category computed by the neural network as described herein, and/or the embedding computed by the neural network as described herein, and/or the clusters created as described herein, may be based on one or more of the following traits of the seeds resulting from being genetically modified, which form the basis for sorting seeds according to the following traits resulting from being genetically modified.

In one embodiment, the seeds are obtained from genetically modified plants. In yet another embodiment, the seeds may be treated so that they take up heterologous DNA directly—see for example US 20150040268, the contents of which are incorporated herein by reference. The plants may be genetically modified to express a protein or alternatively to delete expression of a protein.

Typically, one or more genes have been integrated into the genetic material of a genetically modified plant in order to improve certain properties of the plant. Such genetic modifications also include but are not limited to targeted post-translational modification of protein(s) (oligo- or polypeptides) for example by glycosylation or polymer additions such as prenylated, acetylated or farnesylated moieties or PEG moieties (e.g. as disclosed in Biotechnol Prog. 2001 July-August; 17(4):720-8., Protein Eng Des Sel. 2004 January; 17(1):57-66, Nat Protoc. 2007; 2(5): 1225-35., Curr Opin Chem Biol. 2006 October; 10(5):487-91. Epub 2006 Aug. 28., Biomaterials. 2001 March; 22(5):405-17, Bioconjug Chem. 2005 January-February; 16(1):113-21). In one embodiment, the plants have been genetically modified such that they are rendered tolerant to applications of specific classes of herbicides, such as hydroxy-phenylpyruvate dioxygenase (HPPD) inhibitors; acetolactate synthase (ALS) inhibitors, such as sulfonyl ureas (see e. g. U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073) or imidazolinones (see e. g. U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073); enolpyruvylshikimate-3-phosphate synthase (EPSPS) inhibitors, such as glyphosate (see e. g. WO 92/00377); glutamine synthetase (GS) inhibitors, such as glufosinate (see e. g. EP-A-0242236, EP-A-242246) or oxynil herbicides (see e. g. U.S. Pat. No. 5,559,024). The neural network may compute the classification category, and/or the embedding, and/or perform clustering, for sorting seeds according to the integrated genetic material.

In another embodiment, the plants have been genetically modified to express one or more insecticidal proteins, especially those known from the bacterial genus Bacillus, particularly from Bacillus thuringiensis, such as a-endotoxins, e. g. CryIA(b), CryIA(c), CryIF, CryIF(a2), CryIIA(b), CryIIIA, CryIIIB(b1) or Cry9c; vegetative insecticidal proteins (VIP), e. g. VIP1, VIP2, VIP3 or VIP3A; insecticidal proteins of bacteria colonizing nematodes, for example Photorhabdus or Xenorhabdus; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, for example WO 02/015701). Further examples of such toxins or genetically-modified plants capable of synthesizing such toxins are disclosed, for example, in EP-A 374 753, WO 93/007278, WO 95/34656, EP-A 427 529, EP-A 451 878, WO 03/018810 and WO 03/052073. The methods for producing such genetically modified plants are generally known to the person skilled in the art and are described in brief below. These insecticidal proteins contained in the genetically modified plants impart to the plants producing these proteins protection from harmful pests from certain taxonomic groups of arthropods, particularly to beetles (Coleoptera), flies (Diptera), and butterflies and moths (Lepidoptera) and to plant parasitic nematodes (Nematoda). The neural network may compute the classification category, and/or the embedding, and/or perform clustering, for sorting seeds according to the expressed insecticide proteins.

In another embodiment, the seeds are derived from plants that express one or more proteins to increase the resistance or tolerance of those plants to bacterial, viral or fungal pathogens. Examples of such proteins are the so-called "pathogenesis-related proteins" (PR proteins, see, for example EP-A 0 392 225), plant disease resistance genes (for example potato cultivars, which express resistance genes acting against Phytophthora infestans derived from the mexican wild potato Solanum bulbocastanum) or T4-lyso-zym (e. g. potato cultivars capable of synthesizing these proteins with increased resistance against bacteria such as *Erwinia amylvora*). The methods for producing such genetically modified plants are generally known to the person skilled in the art and are described, in brief below. The neural network may compute the classification category, and/or the embedding, and/or perform clustering, for sorting seeds according to the expressed protein(s).

In still another embodiment, the seeds are obtained from plants that are genetically modified to express one or more proteins to increase the productivity (e. g. bio mass production, grain yield, starch content, oil content or protein content), tolerance to drought, salinity or other growth-limiting environmental factors or tolerance to pests and fungal, bacterial or viral pathogens of those plants. The neural network may compute the classification category, and/or the embedding, and/or perform clustering, for sorting seeds according to the expressed protein(s).

In still another embodiment, the seeds are obtained from plants that are genetically modified to express a polypeptide so as to improve human or animal nutrition, for example oil crops that produce health-promoting long-chain omega-3 fatty acids or unsaturated omega-9 fatty acids. The neural network may compute the classification category, and/or the embedding, and/or perform clustering, for sorting seeds according to the expressed polypeptide.

The seeds which are classified according to embodiments of the present invention may be derived from plant lines-e.g. elite lines. Thus, the seeds may be derived from isogenic plants.

According to some embodiments of the invention, expressing an exogenous polynucleotide within the plant is effected by transforming one or more cells of the plant with the exogenous polynucleotide, followed by generating a mature plant from the transformed cells and cultivating the mature plant under conditions suitable for expressing the exogenous polynucleotide within the mature plant.

According to some embodiments of the invention, the transformation is effected by introducing to the plant cell a nucleic acid construct which includes the exogenous polynucleotide of some embodiments of the invention and at least one promoter for directing transcription of the exogenous polynucleotide in a host cell (a plant cell). The neural network may compute the classification category, and/or the embedding, and/or perform clustering, for sorting seeds according to the nucleic acid construct. Further details of suitable transformation approaches are provided hereinbelow.

As mentioned, the nucleic acid construct according to some embodiments of the invention comprises a promoter sequence and the isolated polynucleotide of some embodiments of the invention.

According to some embodiments of the invention, the isolated polynucleotide is operably linked to the promoter sequence.

A coding nucleic acid sequence is "operably linked" to a regulatory sequence (e.g., promoter) if the regulatory sequence is capable of exerting a regulatory effect on the coding sequence linked thereto.

As used herein, the term "promoter" refers to a region of DNA which lies upstream of the transcriptional initiation site of a gene to which RNA polymerase binds to initiate transcription of RNA. The promoter controls where (e.g., which portion of a plant) and/or when (e.g., at which stage or condition in the lifetime of an organism) the gene is expressed.

According to some embodiments of the invention, the promoter is heterologous to the isolated polynucleotide and/or to the host cell.

As used herein the phrase "heterologous promoter" refers to a promoter from a different species or from the same species but from a different gene locus as of the isolated polynucleotide sequence.

According to some embodiments of the invention, the isolated polynucleotide is heterologous to the plant cell (e.g., the polynucleotide is derived from a different plant species when compared to the plant cell, thus the isolated polynucleotide and the plant cell are not from the same plant species).

Any suitable promoter sequence can be used by the nucleic acid construct of the present invention. Preferably the promoter is a constitutive promoter, a tissue-specific, or an abiotic stress-inducible promoter.

According to some embodiments of the invention, the promoter is a plant promoter, which is suitable for expression of the exogenous polynucleotide in a plant cell.

The nucleic acid construct of some embodiments of the invention can further include an appropriate selectable marker and/or an origin of replication. The neural network may compute the classification category, and/or the embedding, and/or perform clustering, for sorting seeds according to the selectable marker and/or origin of replication. According to some embodiments of the invention, the nucleic acid construct utilized is a shuttle vector, which can propagate both in *E. coli* (wherein the construct comprises an appropriate selectable marker and origin of replication) and be compatible with propagation in cells. The construct according to the present invention can be, for example, a plasmid, a bacmid, a phagemid, a cosmid, a phage, a virus or an artificial chromosome.

The nucleic acid construct of some embodiments of the invention can be utilized to stably or transiently transform plant cells. In stable transformation, the exogenous polynucleotide is integrated into the plant genome and as such it represents a stable and inherited trait. In transient transformation, the exogenous polynucleotide is expressed by the cell transformed but it is not integrated into the genome and as such it represents a transient trait.

There are various methods of introducing foreign genes into both monocotyledonous and dicotyledonous plants (Potrykus, I., Annu. Rev. Plant. Physiol., Plant. Mol. Biol. (1991) 42:205-225; Shimamoto et al., Nature (1989) 338: 274-276). The neural network may compute the classification category, and/or the embedding, and/or perform clustering, for sorting seeds according to the introduced foreign genes.

The principle methods of causing stable integration of exogenous DNA into plant genomic DNA include two main approaches:

(i) *Agrobacterium*-mediated gene transfer: Klee et al. (1987) Annu. Rev. Plant Physiol. 38:467-486; Klee and Rogers in Cell Culture and Somatic Cell Genetics of Plants, Vol. 6, Molecular Biology of Plant Nuclear Genes, eds. Schell, J., and Vasil, L. K., Academic Publishers, San Diego, Calif. (1989) p. 2-25; Gatenby, in Plant Biotechnology, eds. Kung, S. and Arntzen, C. J., Butterworth Publishers, Boston, Mass. (1989) p. 93-112.

(ii) Direct DNA uptake: Paszkowski et al., in Cell Culture and Somatic Cell Genetics of Plants, Vol. 6, Molecular Biology of Plant Nuclear Genes eds. Schell, J., and Vasil, L. K., Academic Publishers, San Diego, Calif. (1989) p. 52-68; including methods for direct uptake of DNA into protoplasts, Toriyama, K. et al. (1988) Bio/Technology 6:1072-1074. DNA uptake induced by brief electric shock of plant cells: Zhang et al. Plant Cell Rep. (1988) 7:379-384. Fromm et al. Nature (1986) 319:791-793. DNA injection into plant cells or tissues by particle bombardment, Klein et al. Bio/Technology (1988) 6:559-563; McCabe et al. Bio/Technology (1988) 6:923-926; Sanford, Physiol. Plant. (1990) 79:206-209; by the use of micropipette systems: Neuhaus et al., Theor. Appl. Genet. (1987) 75:30-36; Neuhaus and Spangenberg, Physiol. Plant. (1990) 79:213-217; glass fibers or silicon carbide whisker transformation of cell cultures, embryos or callus tissue, U.S. Pat. No. 5,464,765 or by the direct incubation of DNA with germinating pollen, DeWet et al. in Experimental Manipulation of Ovule Tissue, eds. Chapman, G. P. and Mantell, S. H. and Daniels, W. Longman, London, (1985) p. 197-209; and Ohta, Proc. Natl. Acad. Sci. USA (1986) 83:715-719.

The *Agrobacterium* system includes the use of plasmid vectors that contain defined DNA segments that integrate into the plant genomic DNA. Methods of inoculation of the plant tissue vary depending upon the plant species and the *Agrobacterium* delivery system. A widely used approach is the leaf disc procedure which can be performed with any tissue explant that provides a good source for initiation of whole plant differentiation. See, e.g., Horsch et al. in Plant Molecular Biology Manual A5, Kluwer Academic Publishers, Dordrecht (1988) p. 1-9. A supplementary approach employs the *Agrobacterium* delivery system in combination with vacuum infiltration. The *Agrobacterium* system is especially viable in the creation of transgenic dicotyledonous plants.

There are various methods of direct DNA transfer into plant cells. In electroporation, the protoplasts are briefly exposed to a strong electric field. In microinjection, the DNA is mechanically injected directly into the cells using very small micropipettes. In microparticle bombardment, the DNA is adsorbed on microprojectiles such as magnesium sulfate crystals or tungsten particles, and the microprojectiles are physically accelerated into cells or plant tissues.

Following stable transformation plant propagation is exercised. The most common method of plant propagation is by seed. Regeneration by seed propagation, however, has the deficiency that due to heterozygosity there is a lack of uniformity in the crop, since seeds are produced by plants according to the genetic variances governed by Mendelian rules. Basically, each seed is genetically different and each will grow with its own specific traits. Therefore, it is preferred that the transformed plant be produced such that the regenerated plant has the identical traits and characteristics of the parent transgenic plant. Therefore, it is preferred that the transformed plant be regenerated by micropropagation which provides a rapid, consistent reproduction of the transformed plants.

Micropropagation is a process of growing new generation plants from a single piece of tissue that has been excised from a selected parent plant or cultivar. This process permits the mass reproduction of plants having the preferred tissue expressing the fusion protein. The new generation plants which are produced are genetically identical to, and have all of the characteristics of, the original plant. Micropropagation allows mass production of quality plant material in a short period of time and offers a rapid multiplication of selected cultivars in the preservation of the characteristics of the original transgenic or transformed plant. The advantages of cloning plants are the speed of plant multiplication and the quality and uniformity of plants produced.

Micropropagation is a multi-stage procedure that requires alteration of culture medium or growth conditions between stages. Thus, the micropropagation process involves four basic stages: Stage one, initial tissue culturing; stage two, tissue culture multiplication; stage three, differentiation and plant formation; and stage four, greenhouse culturing and hardening. During stage one, initial tissue culturing, the tissue culture is established and certified contaminant-free. During stage two, the initial tissue culture is multiplied until a sufficient number of tissue samples are produced from the seedlings to meet production goals. During stage three, the tissue samples grown in stage two are divided and grown into individual plantlets. At stage four, the transformed plantlets are transferred to a greenhouse for hardening where the plants' tolerance to light is gradually increased so that it can be grown in the natural environment.

According to some embodiments of the invention, the transgenic plant is generated by transient transformation of leaf cells, meristematic cells or the whole plant. The neural network may compute the classification category, and/or the embedding, and/or perform clustering, for sorting seeds according to one or more of the following indications of transgenic plant.

Transient transformation can be effected by any of the direct DNA transfer methods described above or by viral infection using modified plant viruses.

Viruses that have been shown to be useful for the transformation of plant hosts include CaMV, Tobacco mosaic virus (TMV), brome mosaic virus (BMV) and Bean Common Mosaic Virus (BV or BCMV). Transformation of plants using plant viruses is described in U.S. Pat. No. 4,855,237 (bean golden mosaic virus; BGV), EP-A 67,553 (TMV), Japanese Published Application No. 63-14693 (TMV), EPA 194,809 (BV), EPA 278,667 (BV); and Gluzman, Y. et al., Communications in Molecular Biology: Viral Vectors, Cold Spring Harbor Laboratory, New York, pp. 172-189 (1988). Pseudovirus particles for use in expressing foreign DNA in many hosts, including plants are described in WO 87/06261.

According to some embodiments of the invention, the virus used for transient transformations is avirulent and thus is incapable of causing severe symptoms such as reduced growth rate, mosaic, ring spots, leaf roll, yellowing, streaking, pox formation, tumor formation and pitting. A suitable avirulent virus may be a naturally occurring avirulent virus or an artificially attenuated virus. Virus attenuation may be effected by using methods well known in the art including, but not limited to, sub-lethal heating, chemical treatment or by directed mutagenesis techniques such as described, for example, by Kurihara and Watanabe (Molecular Plant Pathology 4:259-269, 2003), Gal-on et al. (1992), Atreya et al. (1992) and Huet et al. (1994).

Suitable virus strains can be obtained from available sources such as, for example, the American Type Culture Collection (ATCC) or by isolation from infected plants. Isolation of viruses from infected plant tissues can be effected by techniques well known in the art such as described, for example by Foster and Taylor, Eds. "Plant Virology Protocols: From Virus Isolation to Transgenic Resistance (Methods in Molecular Biology (Humana Pr), Vol 81)", Humana Press, 1998. Briefly, tissues of an infected plant believed to contain a high concentration of a suitable virus, preferably young leaves and flower petals, are ground in a buffer solution (e.g., phosphate buffer solution) to produce a virus infected sap which can be used in subsequent inoculations.

Construction of plant RNA viruses for the introduction and expression of non-viral exogenous polynucleotide sequences in plants is demonstrated by the above references as well as by Dawson, W. O. et al., Virology (1989) 172:285-292; Takamatsu et al. EMBO J. (1987) 6:307-311; French et al. Science (1986) 231:1294-1297; Takamatsu et al. FEBS Letters (1990) 269:73-76; and U.S. Pat. No. 5,316,931.

When the virus is a DNA virus, suitable modifications can be made to the virus itself. Alternatively, the virus can first be cloned into a bacterial plasmid for ease of constructing the desired viral vector with the foreign DNA. The virus can then be excised from the plasmid. If the virus is a DNA virus, a bacterial origin of replication can be attached to the viral DNA, which is then replicated by the bacteria. Transcription and translation of this DNA will produce the coat protein which will encapsidate the viral DNA. If the virus is an RNA virus, the virus is generally cloned as a cDNA and inserted into a plasmid. The plasmid is then used to make all of the constructions. The RNA virus is then produced by transcribing the viral sequence of the plasmid and translation of the viral genes to produce the coat protein(s) which encapsidate the viral RNA.

In one embodiment, a plant viral polynucleotide is provided in which the native coat protein coding sequence has been deleted from a viral polynucleotide, a non-native plant viral coat protein coding sequence and a non-native promoter, preferably the subgenomic promoter of the non-native coat protein coding sequence, capable of expression in the plant host, packaging of the recombinant plant viral polynucleotide, and ensuring a systemic infection of the host by the recombinant plant viral polynucleotide, has been inserted. Alternatively, the coat protein gene may be inactivated by insertion of the non-native polynucleotide sequence within it, such that a protein is produced. The recombinant plant viral polynucleotide may contain one or more additional non-native subgenomic promoters. Each non-native subgenomic promoter is capable of transcribing or expressing adjacent genes or polynucleotide sequences in the plant host and incapable of recombination with each other and with native subgenomic promoters. Non-native (foreign) polynucleotide sequences may be inserted adjacent the native plant viral subgenomic promoter or the native and a non-native plant viral subgenomic promoters if more than one polynucleotide sequence is included. The non-native polynucleotide sequences are transcribed or expressed in the host plant under control of the subgenomic promoter to produce the desired products.

In a second embodiment, a recombinant plant viral polynucleotide is provided as in the first embodiment except that the native coat protein coding sequence is placed adjacent one of the non-native coat protein subgenomic promoters instead of a non-native coat protein coding sequence.

In a third embodiment, a recombinant plant viral polynucleotide is provided in which the native coat protein gene is adjacent its subgenomic promoter and one or more non-native subgenomic promoters have been inserted into the viral polynucleotide. The inserted non-native subgenomic promoters are capable of transcribing or expressing adjacent genes in a plant host and are incapable of recombination with each other and with native subgenomic promoters. Non-native polynucleotide sequences may be inserted adjacent the non-native subgenomic plant viral promoters such that the sequences are transcribed or expressed in the host plant under control of the subgenomic promoters to produce the desired product.

In a fourth embodiment, a recombinant plant viral polynucleotide is provided as in the third embodiment except that the native coat protein coding sequence is replaced by a non-native coat protein coding sequence.

The viral vectors are encapsidated by the coat proteins encoded by the recombinant plant viral polynucleotide to produce a recombinant plant virus. The recombinant plant viral polynucleotide or recombinant plant virus is used to infect appropriate host plants. The recombinant plant viral polynucleotide is capable of replication in the host, systemic spread in the host, and transcription or expression of foreign gene(s) (exogenous polynucleotide) in the host to produce the desired protein.

Techniques for inoculation of viruses to plants may be found in Foster and Taylor, eds. "Plant Virology Protocols: From Virus Isolation to Transgenic Resistance (Methods in Molecular Biology (Humana Pr), Vol 81)", Humana Press, 1998; Maramorosh and Koprowski, eds. "Methods in Virology" 7 vols, Academic Press, New York 1967-1984; Hill, S. A. "Methods in Plant Virology", Blackwell, Oxford, 1984; Walkey, D. G. A. "Applied Plant Virology", Wiley, New York, 1985; and Kado and Agrawa, eds. "Principles and Techniques in Plant Virology", Van Nostrand-Reinhold, New York.

In addition to the above, the polynucleotide of the present invention can also be introduced into a chloroplast genome thereby enabling chloroplast expression.

According to some embodiments of the invention, the transformed plant is homozygote to the transgene (i.e., the exogenous polynucleotide of some embodiments of the invention), and accordingly all seeds generated thereby include the transgene. The neural network may compute the classification category, and/or the embedding, and/or perform clustering, for sorting seeds according to the transgene.

According to some embodiments of the invention, the seeds are derived from a plant which has undergone genome editing. The neural network may compute the classification category, and/or the embedding, and/or perform clustering, for sorting seeds according to an indication of having undergone genome editing.

Genome editing is a reverse genetics method which uses artificially engineered nucleases to cut and create specific double-stranded breaks at a desired location(s) in the genome, which are then repaired by cellular endogenous processes such as, homology directed repair (HDR) and non-homologous end-joining (NHEJ). NHEJ directly joins the DNA ends in a double-stranded break, while HDR utilizes a homologous sequence as a template for regenerating the missing DNA sequence at the break point. In order to introduce specific nucleotide modifications to the genomic DNA, a DNA repair template containing the desired sequence must be present during HDR. Genome editing cannot be performed using traditional restriction endonucleases since most restriction enzymes recognize a few base pairs on the DNA as their target and the probability is very high that the recognized base pair combination will be found in many locations across the genome resulting in multiple cuts not limited to a desired location. To overcome this challenge and create site-specific single- or double-stranded breaks, several distinct classes of nucleases have been discovered and bioengineered to date. These include the meganucleases, Zinc finger nucleases (ZFNs), transcription-activator like effector nucleases (TALENs) and CRISPR/Cas system.

Genome editing is a powerful mean to impact target traits by modifications of the target plant genome sequence. Such modifications can result in new or modified alleles or regulatory elements.

In addition, the traces of genome-edited techniques can be used for marker assisted selection (MAS) as is further described hereinunder. Target plants for the mutagenesis/genome editing methods according to the invention are any plants of interest including monocot or dicot plants.

Over expression of a polypeptide by genome editing can be achieved by: (i) replacing an endogenous sequence encoding the polypeptide of interest or a regulatory sequence under which it is placed, and/or (ii) inserting a new gene encoding the polypeptide of interest in a targeted region of the genome, and/or (iii) introducing point mutations which result in up-regulation of the gene encoding the polypeptide of interest (e.g., by altering the regulatory sequences such as promoter, enhancers, 5'-UTR and/or 3'-UTR, or mutations in the coding sequence).

Genome Editing Systems Overview

Several systems have been reported to enable genome editing implementation. Examples detailed herein below:

Meganucleases—Meganucleases are commonly grouped into four families: the LAGLIDADG family, the GIY-YIG family, the His-Cys box family and the HNH family. These families are characterized by structural motifs, which affect catalytic activity and recognition sequence. For instance, members of the LAGLIDADG family are characterized by having either one or two copies of the conserved LAGLIDADG motif. The four families of meganucleases are widely separated from one another with respect to conserved structural elements and, consequently, DNA recognition sequence specificity and catalytic activity. Meganucleases are found commonly in microbial species and have the unique property of having very long recognition sequences (>14 bp) thus making them naturally very specific for cutting at a desired location. This can be exploited to make site-specific double-stranded breaks directing modifications in regulatory elements or coding regions upon introduction of the desired sequence. One of skill in the art can use these naturally occurring meganucleases, however the number of such naturally occurring meganucleases is limited. To overcome this challenge, mutagenesis and high throughput screening methods have been used to create meganuclease variants that recognize unique sequences. For example, various meganucleases have been fused to create hybrid enzymes that recognize a new sequence. Alternatively, DNA interacting amino acids of the meganuclease can be altered to design sequence specific meganucleases (see e.g., U.S. Pat. No. 8,021,867). Meganucleases can be designed using the methods described in e.g., Certo, M T et al. Nature Methods (2012) 9:073-975; U.S. Pat. Nos. 8,304,222; 8,021,867; 8,119,381; 8,124,369; 8,129,134; 8,133,697; 8,143,015; 8,143,016; 8, 148,098; or 8, 163,514, the contents of each are incorporated herein by reference in their entirety. Alternatively, meganucleases with site specific cutting characteristics can be obtained using commercially available technologies e.g., Precision Biosciences' Directed Nuclease Editor™ genome editing technology.

ZFNs and TALENs—Two distinct classes of engineered nucleases, zinc-finger nucleases (ZFNs) and transcription activator-like effector nucleases (TALENs), have both proven to be effective at producing targeted double-stranded breaks (Christian et al., 2010; Kim et al., 1996; Li et al., 2011; Mahfouz et al., 2011; Miller et al., 2010).

Basically, ZFNs and TALENs restriction endonuclease technology utilizes a non-specific DNA cutting enzyme which is linked to a specific DNA binding domain (either a series of zinc finger domains or TALE repeats, respectively). Typically a restriction enzyme whose DNA recognition site and cleaving site are separate from each other is selected. The cleaving portion is separated and then linked to a DNA binding domain, thereby yielding an endonuclease with very high specificity for a desired sequence. An exemplary restriction enzyme with such properties is FokI. Additionally FokI has the advantage of requiring dimerization to have nuclease activity and this means the specificity increases dramatically as each nuclease partner recognizes a unique DNA sequence. To enhance this effect, FokI nucleases have been engineered that can only function as heterodimers and have increased catalytic activity. The heterodimer functioning nucleases avoid the possibility of unwanted homodimer activity and thus increase specificity of the double-stranded break.

Thus, for example to target a specific site, ZFNs and TALENs are constructed as nuclease pairs, with each member of the pair designed to bind adjacent sequences at the targeted site. Upon transient expression in cells, the nucleases bind to their target sites and the FokI domains heterodimerize to create a double-stranded break. Repair of these double-stranded breaks through the nonhomologous end-joining (NHEJ) pathway most often results in small deletions or small sequence insertions. Since each repair made by NHEJ is unique, the use of a single nuclease pair can produce an allelic series with a range of different deletions at the target site. The deletions typically range anywhere from a few base pairs to a few hundred base pairs in length, but larger deletions have successfully been generated in cell culture by using two pairs of nucleases simultaneously (Carlson et al., 2012; Lee et al., 2010). In addition, when a fragment of DNA with homology to the targeted region is introduced in conjunction with the nuclease pair, the double-stranded break can be repaired via homology directed repair to generate specific modifications (Li et al., 2011; Miller et al., 2010; Urnov et al., 2005).

Although the nuclease portions of both ZFNs and TALENs have similar properties, the difference between these engineered nucleases is in their DNA recognition peptide. ZFNs rely on Cys2-His2 zinc fingers and TALENs on TALEs. Both of these DNA recognizing peptide domains have the characteristic that they are naturally found in combinations in their proteins. Cys2-His2 Zinc fingers typically found in repeats that are 3 bp apart and are found in diverse combinations in a variety of nucleic acid interacting proteins. TALEs on the other hand are found in repeats with a one-to-one recognition ratio between the amino acids and the recognized nucleotide pairs. Because both zinc fingers and TALEs happen in repeated patterns, different combinations can be tried to create a wide variety of sequence specificities. Approaches for making site-specific zinc finger endonucleases include, e.g., modular assembly (where Zinc fingers correlated with a triplet sequence are attached in a row to cover the required sequence), OPEN (low-stringency selection of peptide domains vs. triplet nucleotides followed by high-stringency selections of peptide combination vs. the final target in bacterial systems), and bacterial one-hybrid screening of zinc finger libraries, among others. ZFNs can also be designed and obtained commercially from e.g., Sangamo Biosciences™ (Richmond, Calif.).

Method for designing and obtaining TALENs are described in e.g. Reyon et al. Nature Biotechnology 2012 May; 30(5):460-5; Miller et al. Nat Biotechnol. (2011) 29: 143-148; Cermak et al. Nucleic Acids Research (2011) 39 (12): e82 and Zhang et al. Nature Biotechnology (2011) 29 (2): 149-53. A recently developed web-based program named Mojo Hand was introduced by Mayo Clinic for designing TAL and TALEN constructs for genome editing applications (can be accessed through www(dot)talendesign (dot)org). TALEN can also be designed and obtained commercially from e.g., Sangamo Biosciences™ (Richmond, Calif.).

The ZFN/TALEN system capability for precise targeting can be utilized for directing modifications in regulatory elements and/or coding regions upon introduction of the sequence of interest for trait improvement.

CRISPR/Cas9—The CRIPSR/Cas system for genome editing contains two distinct components: a gRNA (guide RNA) and an endonuclease e.g. Cas9.

The gRNA is typically a 20 nucleotide sequence encoding a combination of the target homologous sequence (crRNA) and the endogenous bacterial RNA that links the crRNA to the Cas9 nuclease (tracrRNA) in a single chimeric transcript. The gRNA/Cas9 complex is recruited to the target sequence by the base-pairing between the gRNA sequence and the complement genomic DNA. For successful binding of Cas9, the genomic target sequence must also contain the correct Protospacer Adjacent Motif (PAM) sequence immediately following the target sequence. The binding of the gRNA/Cas9 complex localizes the Cas9 to the genomic target sequence so that the Cas9 can cut both strands of the DNA causing a double-strand break. Just as with ZFNs and TALENs, the double-stranded brakes produced by CRISPR/Cas can undergo homologous recombination or NHEJ.

The Cas9 nuclease has two functional domains: RuvC and HNH, each cutting a different DNA strand. When both of these domains are active, the Cas9 causes double strand breaks in the genomic DNA.

A significant advantage of CRISPR/Cas is that the high efficiency of this system coupled with the ability to easily create synthetic gRNAs enables multiple genes to be targeted simultaneously. In addition, the majority of cells carrying the mutation present biallelic mutations in the targeted genes.

However, apparent flexibility in the base-pairing interactions between the gRNA sequence and the genomic DNA target sequence allows imperfect matches to the target sequence to be cut by Cas9.

Modified versions of the Cas9 enzyme containing a single inactive catalytic domain, either RuvC- or HNH-, are called 'nickases'. With only one active nuclease domain, the Cas9 nickase cuts only one strand of the target DNA, creating a single-strand break or 'nick'. A single-strand break, or nick, is normally quickly repaired through the HDR pathway, using the intact complementary DNA strand as the template. However, two proximal, opposite strand nicks introduced by a Cas9 nickase are treated as a double-strand break, in what is often referred to as a 'double nick' CRISPR system. A double-nick can be repaired by either NHEJ or HDR depending on the desired effect on the gene target. Thus, if specificity and reduced off-target effects are crucial, using the Cas9 nickase to create a double-nick by designing two gRNAs with target sequences in close proximity and on opposite strands of the genomic DNA would decrease off-target effect as either gRNA alone will result in nicks that will not change the genomic DNA.

Modified versions of the Cas9 enzyme containing two inactive catalytic domains (dead Cas9, or dCas9) have no nuclease activity while still able to bind to DNA based on gRNA specificity. The dCas9 can be utilized as a platform for DNA transcriptional regulators to activate or repress gene expression by fusing the inactive enzyme to known regulatory domains. For example, the binding of dCas9 alone to a target sequence in genomic DNA can interfere with gene transcription.

There are a number of publically available tools available to help choose and/or design target sequences as well as lists of bioinformatically determined unique gRNAs for different genes in different species such as the Feng Zhang lab's Target Finder, the Michael Boutros lab's Target Finder (E-CRISP), the RGEN Tools: Cas-OFFinder, the CasFinder: Flexible algorithm for identifying specific Cas9 targets in genomes and the CRISPR Optimal Target Finder.

In order to use the CRISPR system, both gRNA and Cas9 should be expressed in a target cell. The insertion vector can contain both cassettes on a single plasmid or the cassettes are expressed from two separate plasmids. CRISPR plasmids are commercially available such as the px330 plasmid from Addgene.

Other genome-editing platforms contemplated for manipulating the plants from which the seeds are derived include recombinant adeno-associated virus (rAAV) platform, the "hit and run" or "in-out", the "double-replacement" or "tag and exchange" strategy, site-specific recombinase, transposase, homology directed repair (HDR).

Methods for qualifying efficacy and detecting sequence alteration are well known in the art and include, but not limited to, DNA sequencing, electrophoresis, an enzyme-based mismatch detection assay and a hybridization assay such as PCR, RT-PCR, RNase protection, in-situ hybridization, primer extension, Southern blot, Northern Blot and dot blot analysis.

Sequence alterations in a specific gene can also be determined at the protein level using e.g. chromatography, electrophoretic methods, immunodetection assays such as ELISA and Western blot analysis and immunohistochemistry.

In addition, one ordinarily skilled in the art can readily design a knock-in/knock-out construct including positive and/or negative selection markers for efficiently selecting transformed cells that underwent a homologous recombination event with the construct. Positive selection provides a means to enrich the population of clones that have taken up foreign DNA. Non-limiting examples of such positive markers include glutamine synthetase, dihydrofolate reductase (DHFR), markers that confer antibiotic resistance, such as neomycin, hygromycin, puromycin, and blasticidin S resistance cassettes. Negative selection markers are necessary to select against random integrations and/or elimination of a marker sequence (e.g. positive marker). Non-limiting examples of such negative markers include the herpes simplex-thymidine kinase (HSV-TK) which converts ganciclovir (GCV) into a cytotoxic nucleoside analog, hypoxanthine phosphoribosyltransferase (HPRT) and adenine phosphoribosytransferase (ARPT).

In addition, as described above, point mutations which activate a gene-of-interest and/or which result in overexpression of a polypeptide-of-interest can be also introduced into plants by means of genome editing. Such mutation can be for example, deletions of repressor sequences which result in activation of the gene-of-interest; and/or mutations which insert nucleotides and result in activation of regulatory sequences such as promoters and/or enhancers.

It will be appreciated that the system described herein is capable of categorizing a heterogeneous population or batch of seeds into groups or clusters. The neural network may compute the classification category, and/or the embedding, and/or perform clustering, for sorting the heterogeneous population or batch of seeds based on one or more of the following indications, as described herein.

In one embodiment, all the seeds of the heterogeneous population are grown under the same environmental conditions, during the same season and/or in the same geographical location.

Alternatively, the seeds may be heterogeneous in that they are not grown under the same environmental conditions, during the same season and/or in the same geographical location.

Alternatively, the seeds may be heterogeneous in their resistance to a stress, as further described herein below.

In one embodiment, the heterogeneous population of seeds comprises seeds that are viable and seeds that are non-viable (i.e. will not germinate).

In one embodiment, the heterogeneous population of seeds comprises seeds that are genetically modified and non-genetically modified.

In another embodiment, heterogeneous population of seeds comprises seeds that are haploid and seeds that are diploid.

In yet another embodiment, heterogeneous population of seeds comprises seeds that have statistically dissimilar microbiomes.

As used herein, the term "microbiome" refers to the totality of microbes (bacteria, fungae, protists), their genetic elements (genomes) in a defined environment—i.e. in the seed.

Methods of qualifying similarity of microbiomes are described herein below.

In another embodiment, the heterogeneous population of seeds comprises seeds that are infected with a disease causing pathogen and seeds which are not infected with a disease causing pathogen. The disease causing pathogen may be a virus, a fungus or a bacteria.

In another embodiment, the heterogeneous population of seeds comprises seeds of different varieties of the same plant species.

In another embodiment, the heterogeneous population of seeds comprises seeds of the different species of a plant.

In still another embodiment, the heterogeneous population of seeds comprises a mixture of seeds of the same variety or species some of which express a heterologous protein and some of which do not express the heterologous protein (e.g. by genetic modification).

In another embodiment, the heterogeneous population of seeds comprises a mixture of seeds derived from isogenic plants. The seeds may differ in a particular trait.

In yet another embodiment, the heterogeneous population of seeds comprises a mixture of seeds of the same species of a plant having different phenotypes. One such phenotype includes a stress resistance, such as abiotic stress resistance or a biotic stress resistance.

The phrase "abiotic stress" as used herein refers to any adverse effect (due to a non-living factor) on metabolism, growth, reproduction and/or viability of a plant. Accordingly, abiotic stress can be induced by suboptimal environmental growth conditions such as, for example, salinity, osmotic stress, water deprivation, drought, flooding, freezing, low or high temperature, heavy metal toxicity, anaerobiosis, nutrient deficiency (e.g., nitrogen deficiency or limited nitrogen), atmospheric pollution or UV irradiation.

The phrase "abiotic stress tolerance" as used herein refers to the ability of a plant to endure an abiotic stress without suffering a substantial alteration in metabolism, growth, productivity and/or viability.

Non-limiting examples of abiotic stress conditions include, salinity, osmotic stress, drought, water deprivation, excess of water (e.g., flood, waterlogging), etiolation, low temperature (e.g., cold stress), high temperature, heavy metal toxicity, anaerobiosis, nutrient deficiency (e.g., nitrogen deficiency or nitrogen limitation), nutrient excess, atmospheric pollution and UV irradiation.

The phrase "biotic stress" as used herein refers to any adverse effect (due to a living factor) on metabolism, growth, reproduction and/or viability of a plant. Exemplary biotic stresses include nematode stress, insect herbivory stress, fungal pathogen stress, bacterial pathogen stress and viral pathogen stress.

As mentioned, the system may classify seeds into seeds that are resistant to a stress and seeds that are non-resistant to a stress (or more resistant to a stress and less resistant to a stress).

It will be appreciated that seeds that are non-resistant to stress may generate plants having a reduced growth phenotype as compared to a resistant plant or a control plant grown under identical conditions. The growth phenotype may be reduced by at least 5%, 10%, 15%, 20%, 25%, 30%, 50%, 45%, 50%, 55%, 60%, 65%, 70%, 75%, 80%, 85%, 90%, 95% or more compared to the resistant plant. This may be seen as having reduced root biomass and/or root coverage and/or root density, and/or root length and/or root length growth rate and/or growth rate, and/or photosynthetic capacity, and/or vigor, and/or harvest index, and/or grain filling period, and/or flowering, and/or heading and/or plant height, and/or oil content and/or seed yield as compared to a resistant plant or a control plant grown under identical conditions. In addition seeds that are non-resistant to stress may germinate slower than those that are classified as being resistant to the stress.

It will be further appreciated that when categorizing seeds into a stress resistant and non-stress resistant classification, preferably the categories are such that the resistance is for the identical stress. Thus, for example seeds can be categorized into an abiotic stress resistant category and a non-abiotic stress resistant category.

In a further embodiment, the seeds may be categorized and/or sorted into two different types of stress resistance—for example one category refers to seeds that are more abiotic stress resistant and another category refers to seeds that are more biotic stress resistant.

In another embodiment, the mixture of seeds comprises seeds (e.g. of the same variant or species) which generate plants derived therefrom of different biomass.

As used herein the phrase "plant biomass" refers to the amount (e.g., measured in grams of air-dry tissue) of a tissue produced from the plant in a growing season, which could also determine or affect the plant yield or the yield per growing area. An increase in plant biomass can be in the whole plant or in parts thereof such as aboveground (harvestable) parts, vegetative biomass, leaf size or area, leaf thickness, roots and seeds.

In another embodiment, the mixture of seeds comprises seeds (e.g. of the same variant or species) which generate plants derived therefrom having different root biomass and/ or root coverage and/or root density, and/or root length and/or root length growth rate and/or growth rate, and/or photosynthetic capacity, and/or vigor, and/or harvest index, and/or grain filling period, and/or flowering, and/or heading and/or plant height, and/or oil content and/or seed yield. The difference in the phenotype or trait of the plants may be as a result of genetic modification or as a result of breeding. The neural network may compute the classification category, and/or the embedding, and/or perform clustering, for sorting seeds according to a prediction of different root biomass and/or root coverage and/or root density, and/or root length and/or root length growth rate and/or growth rate, and/or photosynthetic capacity, and/or vigor, and/or harvest index, and/or grain filling period, and/or flowering, and/or heading and/or plant height, and/or oil content and/or seed yield, as described herein.

As used herein the term "root biomass" refers to the total weight of the plant's root(s). Root biomass can be determined directly by weighing the total root material (fresh and/or dry weight) of a plant.

As used herein the phrase "root coverage" refers to the total area or volume of soil or of any plant-growing medium encompassed by the roots of a plant.

According to some embodiments of the invention, the root coverage is the minimal convex volume encompassed by the roots of the plant.

As used herein the term "root density" refers to the density of roots in a given area (e.g., area of soil or any plant growing medium). The root density can be determined by counting the root number per a predetermined area at a predetermined depth (in units of root number per area, e.g., $mm^2$, $cm^2$ or $m^2$).

As used herein the phrase "root length" refers to the total length of the longest root of a single plant.

As used herein the phrase "root length growth rate" refers to the change in total root length per plant per time unit (e.g., per day).

As used herein the phrase "growth rate" refers to the increase in plant organ/tissue size per time (can be measured in $cm^2$ per day or cm/day).

As used herein the phrase "photosynthetic capacity" (also known as "$A_{max}$") is a measure of the maximum rate at which leaves are able to fix carbon during photosynthesis. It is typically measured as the amount of carbon dioxide that is fixed per square meter per second, for example as $\mu mol$ $m^{-2}$ $sec^{-1}$. Plants are able to increase their photosynthetic capacity by several modes of action, such as by increasing the total leaves area (e.g., by increase of leaves area, increase in the number of leaves, and increase in plant's vigor, e.g., the ability of the plant to grow new leaves along time course) as well as by increasing the ability of the plant to efficiently execute carbon fixation in the leaves. Hence, the increase in total leaves area can be used as a reliable measurement parameter for photosynthetic capacity increment.

As used herein the phrase "plant vigor" refers to the amount (measured by weight) of tissue produced by the plant in a given time. Hence increased vigor could determine or affect the plant yield or the yield per growing time or growing area. In addition, early vigor (seed and/or seedling) results in improved field stand.

Improving early vigor is an important objective of modern rice breeding programs in both temperate and tropical rice cultivars. Long roots are important for proper soil anchorage in water-seeded rice. Where rice is sown directly into flooded fields, and where plants must emerge rapidly through water, longer shoots are associated with vigour. Where drill-seeding is practiced, longer mesocotyls and coleoptiles are important for good seedling emergence. The ability to engineer early vigor into plants would be of great importance in agriculture. For example, poor early vigor has been a limitation to the introduction of maize (*Zea mays* L.) hybrids based on Corn Belt germplasm in the European Atlantic.

As used herein the phrase "Harvest index" refers to the efficiency of the plant to allocate assimilates and convert the vegetative biomass in to reproductive biomass such as fruit and seed yield.

Harvest index is influenced by yield component, plant biomass and indirectly by all tissues participant in remobilization of nutrients and carbohydrates in the plants such as stem width, rachis width and plant height. Improving harvest index will improve the plant reproductive efficiency (yield per biomass production) hence will improve yield per growing area. The Harvest Index can be calculated using Formulas 15, 16, 17, 18 and 65 as described below.

As used herein the phrase "Grain filling period" refers to the time in which the grain or seed accumulates the nutrients and carbohydrates until seed maturation (when the plant and grains/seeds are dried).

Grain filling period is measured as number of days from flowering/heading until seed maturation. Longer period of "grain filling period" can support remobilization of nutrients and carbohydrates that will increase yield components such as grain/seed number, 1000 grain/seed weight and grain/seed yield.

As used herein the phrase "flowering" refers to the time from germination to the time when the first flower is open.

As used herein the phrase "heading" refers to the time from germination to the time when the first head immerges.

As used herein the phrase "plant height" refers to measuring plant height as indication for plant growth status, assimilates allocation and yield potential. In addition, plant height is an important trait to prevent lodging (collapse of plants with high biomass and height) under high density agronomical practice.

Plant height is measured in various ways depending on the plant species but it is usually measured as the length between the ground level and the top of the plant, e.g., the head or the reproductive tissue.

The phrase "oil content" as used herein refers to the amount of lipids in a given plant organ, either the seeds (seed oil content) or the vegetative portion of the plant (vegetative oil content) and is typically expressed as percentage of dry weight (10% humidity of seeds) or wet weight (for vegetative portion).

As used herein the phrase "seed yield" refers to the number or weight of the seeds per plant, pod or spike weight, seeds per pod, or per growing area or to the weight of a single seed, or to the oil extracted per seed. Hence seed yield can be affected by seed dimensions (e.g., length, width, perimeter, area and/or volume), number of (filled) seeds and seed filling rate and by seed oil content. Hence increase seed yield per plant could affect the economic benefit one can obtain from the plant in a certain growing area and/or growing time; and increase seed yield per growing area could be achieved by increasing seed yield per plant, and/or by increasing number of plants grown on the same given area or by increase harvest index (seed yield per the total biomass).

It should be noted that a plant trait such as those described herein [e.g., yield, growth rate, biomass, vigor, oil content, fiber yield, fiber quality, fiber length, harvest index, grain filling period, flowering, heading, plant height, photosynthetic capacity, fertilizer use efficiency (e.g., nitrogen use efficiency)] can be determined under stress (e.g., abiotic stress, biotic stress, nitrogen-limiting conditions) and/or non-stress (normal) conditions. The neural network may compute the classification category, and/or the embedding, and/or perform clustering, for sorting seeds according to a prediction of yield, growth rate, biomass, vigor, oil content, fiber yield, fiber quality, fiber length, harvest index, grain filling period, flowering, heading, plant height, photosynthetic capacity, fertilizer use efficiency, as described herein.

As used herein, the phrase "non-stress conditions" or "normal conditions" refers to the growth conditions (e.g., water, temperature, light-dark cycles, humidity, salt concentration, fertilizer concentration in soil, nutrient supply such as nitrogen, phosphorous and/or potassium), that do not significantly go beyond the everyday climatic and other abiotic conditions that plants may encounter, and which allow growth, metabolism, reproduction and/or viability of a plant at any stage in its life cycle (e.g., in a crop plant from seed to a mature plant and back to seed again). Persons skilled in the art are aware of normal soil conditions and climatic conditions for a given plant in a given geographic location. It should be noted that while the non-stress conditions may include some mild variations from the optimal conditions (which vary from one type/species of a plant to another), such variations do not cause the plant to cease growing without the capacity to resume growth.

It will be appreciated that following the categorization and sorting of the seeds according to the teachings of the present invention, it is contemplated that homogeneous populations of seeds can be obtained.

In one embodiment, the homogeneity of the seeds is related to the potential of the seeds to germinate into plants having the same trait/phenotype as further described herein above.

In another embodiment, the homogeneity of the seeds is related to the genome of the seeds—e.g. being derived from an identical isogenic line, or expressing a particular gene.

In still another embodiment, the homogeneity of the seeds is related to the color of the fruit of plants which germinate therefrom.

In still another embodiment, the homogeneity of the seeds is related to the seeds being derived from the same F1 variant.

In still another embodiment, the homogeneity of the seeds is related to the seeds being hybrid seeds (as opposed to non-hybrid).

The term "non-hybrid seed" refers to a seed that is either an ancestor of the F1 hybrid seed or a progeny of the F1 hybrid seed. In one embodiment, the non-hybrid seed is from the parent plant line. In another embodiment, the non-hybrid seed is from a plant which is grown from the hybrid seed.

In yet another embodiment, the homogeneity of the seeds is related to the similarity in their microbiome.

According to one embodiment of this aspect of the present invention two microbiomes can be statistically significantly similar when they comprise at least 50% of the same microbial species, at least 60% of the same microbial species, at least 70% of the same microbial species, at least 80% of the same microbial species, at least 90% of the same microbial species, at least 91% of the same microbial species, at least 92% of the same microbial species, at least 93% of the same microbial species, at least 94% of the same microbial species, at least 95% of the same microbial species, at least 96% of the same microbial species, at least 97% of the same microbial species, at least 98% of the same microbial species, at least 99% of the same microbial species or 100% of the same microbial species.

According to one embodiment of this aspect of the present invention two microbiomes can be statistically significantly similar when they comprise at least 50% of the same microbial genus, at least 60% of the same microbial genus, at least 70% of the same microbial genus, at least 80% of the same microbial genus, at least 90% of the same microbial genus, at least 91% of the same microbial genus, at least 92% of the same microbial genus, at least 93% of the same microbial genus, at least 94% of the same microbial genus, at least 95% of the same microbial genus, at least 96% of the same microbial genus, at least 97% of the same microbial genus, at least 98% of the same microbial genus, at least 99% of the same microbial genus or 100% of the same microbial genus.

Additionally, or alternatively, microbiomes may be statistically similar when the relative quantity (e.g. occurrence) of at least five microbes of interest is identical. According to another embodiment, microbiomes may be statistically significantly similar when the relative amount of at least 10% of microbial bacterial species is identical. According to another embodiment, microbiomes may be statistically significantly similar when the relative amount of at least 20% of microbial bacterial species is identical. According to another embodiment, microbiomes may be statistically significantly similar when the relative amount of at least 30% of microbial bacterial species is identical. According to another embodiment, microbiomes may be statistically significantly similar when the relative amount of at least 40% of microbial bacterial species is identical. According to another embodiment, microbiomes may be statistically significantly similar when the relative amount of at least 50% of microbial bacterial species is identical. According to another embodiment, microbiomes may be statistically significantly similar when the relative amount of at least 60% of microbial bacterial species is identical. According to another embodiment, microbiomes may be statistically significantly similar when the relative amount of at least 70% of microbial bacterial species is identical. According to another embodiment, microbiomes may be statistically significantly similar when the relative amount of at least 80% of microbial bacterial species is identical. According to another embodiment, microbiomes may be statistically significantly similar when the relative amount of at least 90% of microbial bacterial species is identical.

Additionally, or alternatively, microbiomes may be statistically significant similar when the quantity (e.g. occurrence) in the microbiome of at least five microbe of interest is identical. According to another embodiment, microbiomes may be statistically significantly similar when the absolute amount of at least 10% of their species is identical. According to another embodiment, microbiomes may be statistically significantly similar when the absolute amount of at least 20% of their species is identical. According to another embodiment, microbiomes may be statistically significantly similar when the absolute amount of at least 30% of their species is identical. According to another embodiment, microbiomes may be statistically significantly similar when the absolute amount of at least 40% of their species is identical. According to another embodiment, microbiomes may be statistically significantly similar when the absolute amount of at least 50% of their species is identical. According to another embodiment, microbiomes may be statistically significantly similar when the absolute amount of at least 60% of their species is identical. According to another embodiment, microbiomes may be statistically significantly similar when the absolute amount of at least 70% of their species are identical. According to another embodiment, microbiomes may be statistically significantly similar when the absolute amount of at least 80% of their species is identical. According to another embodiment, microbiomes may be statistically significantly similar when the absolute amount of at least 90% of their species is identical.

According to another embodiment, microbiomes may be statistically significantly similar when the absolute amount of at least 10% of their genus is identical. According to another embodiment, microbiomes may be statistically significantly similar when the absolute amount of at least 20% of their genus is identical. According to another embodiment, microbiomes may be statistically significantly similar when the absolute amount of at least 30% of their genus is identical. According to another embodiment, microbiomes may be statistically significantly similar when the absolute amount of at least 40% of their genus is identical. According to another embodiment, microbiomes may be statistically significantly similar when the absolute amount of at least 50% of their genus is identical. According to another embodiment, microbiomes may be statistically significantly similar when the absolute amount of at least 60% of their genus is identical. According to another embodiment, microbiomes may be statistically significantly similar when the absolute amount of at least 70% of their genus is identical. According to another embodiment, microbiomes may be statistically significantly similar when the absolute amount of at least 80% of their genus is identical. According to another embodiment, microbiomes may be statistically significantly similar when the absolute amount of at least 90% of their genus is identical.

Thus, the fractional percentage of microbes (e.g. relative amount, ratio, distribution, frequency, percentage, etc.) of the total may be statistically similar.

In still another embodiment, the homogeneity of the seeds is related to the seeds being of a particular hybrid and not derived from the female parental line.

The homogeneous population of seeds may be such that at least 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.991%, 99.992%, 99.993%, 99.994%, 99.995%, 99.996%, 99.997%, 99.998%, 99.999%, 99.9991%, 99.9992%, 99.9993%, 99.9994%, 99.9995%, 99.9996%, 99.9997%, 99.9998%, 99.9999% of the seeds are identical in any (or any combination) of the above mentioned ways.

Thus, according to another aspect of the present invention there is provided a container or group of containers comprising a plurality of seeds, wherein the seeds are identical with respect to a trait, a genome or a microbiome.

The container may be any vehicle that is capable of holding the seeds—such as a bag, a box, a sack or a crate.

The container may be labeled with a suitable label indicating the source of the seed and/or the purity of the batch (as measured according to embodiments of the present invention).

The container or group of containers typically comprises more than 100 seeds, more than 1000 seeds, more than 10,000 seeds, more than 100,000 seeds, more than 1,000,000 seeds, more than 10,000,000 seeds, or even more than 100,000,000 seeds.

The container may comprise seeds from a single plant or preferably more than one plant.

The weight of the homogeneous populations of seeds in the container or group of containers may vary from 10 grams, 100 grams, 500 grams, 1 kg, 10 kg, 20 kg, 50 kg, 100 kgs, 1 ton or more.

The present invention further comprises planting the seeds from the containers.

Thus, according to an aspect of some embodiments of the invention there is provided a method of growing a crop comprising seeding the homogenous population of seeds of the invention, thereby growing the crop. In one embodiment, the seeds are grown in an environment under abiotic stress conditions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term classifying of seeds may sometimes be interchanged with the term clustering of seeds, for example, when multiple seed images are analyzed, each image may be classified and used to creating clusters, and/or the seed images may be embedded and the embeddings may be clustered. The term classification category may sometimes be interchanged with the term embedding, for example, the output of the trained neural network in response to an image of a seed may be one or more classification categories, or a vector storing a computed embedding. It is noted that the classification category and the embedding may be outputted by the same trained neural network, for example, the classification category is outputted by the last layer of the neural network, and the embedding is outputted by a hidden embedding layer of the neural network.

Figure 2:
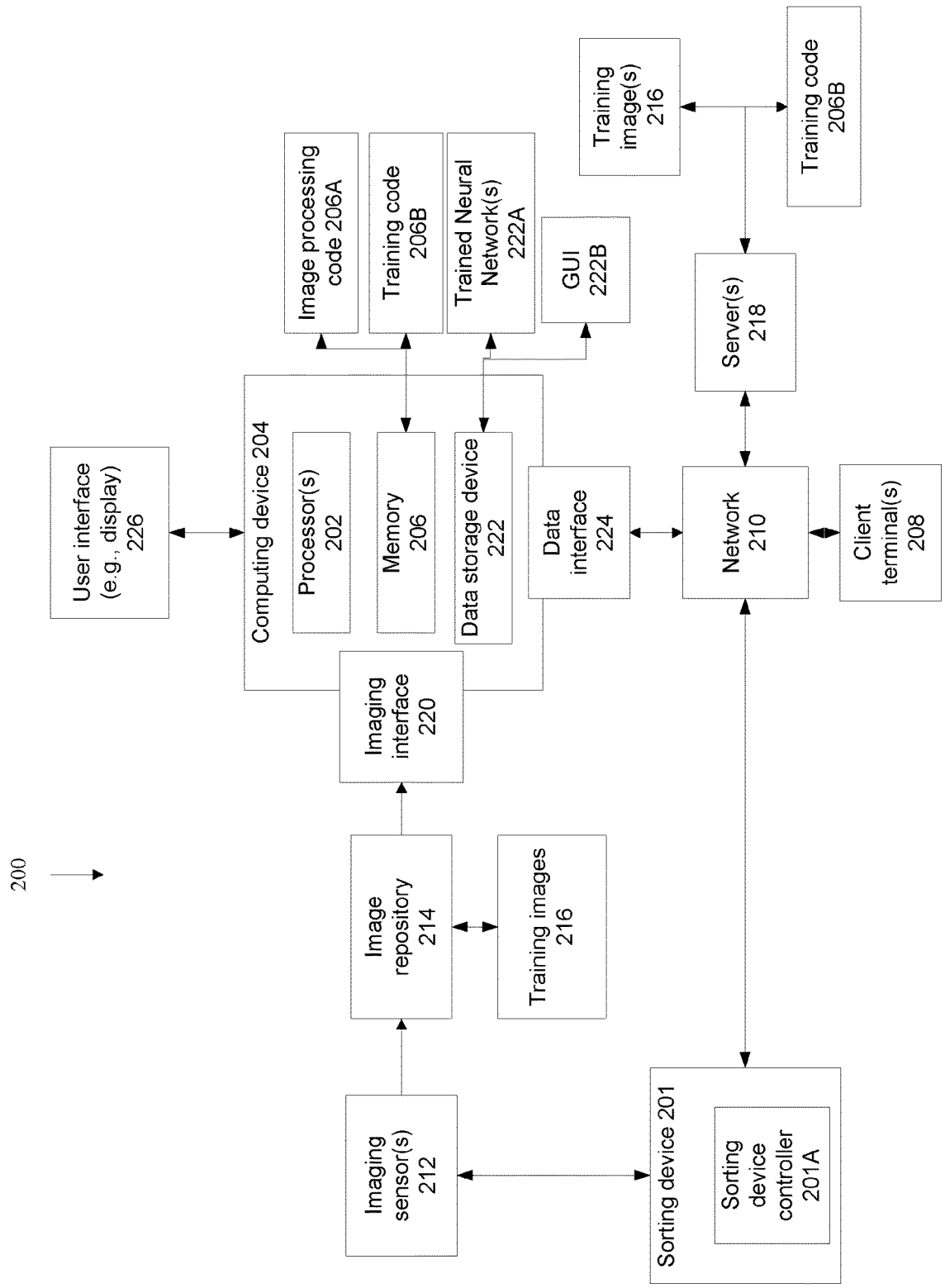
FIG. 2 is a block diagram of components of a system for classifying and/or clustering seeds according to images of the seeds, and/or for training neural networks for classifying and/or clustering the images of the seeds, in accordance with some embodiments of the present invention.
Figure 3:
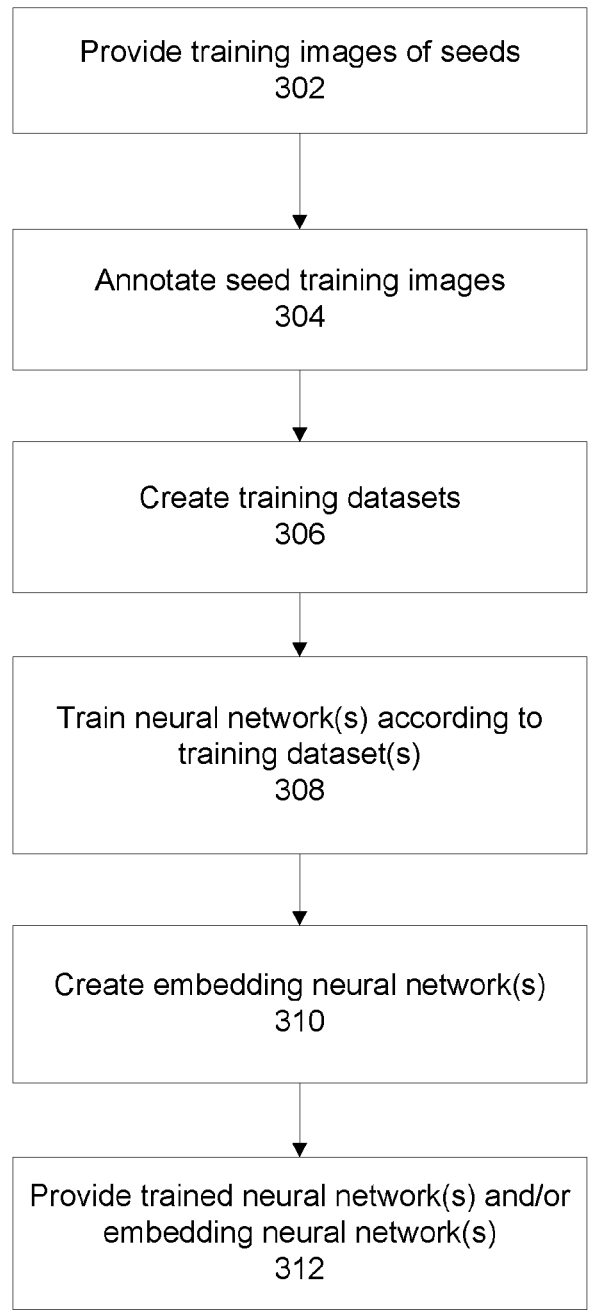
FIG. 3 is a flowchart of a process for training one or more neural networks for computing classification categories and/or embeddings according to seed images, in accordance with some embodiments of the present invention.

Reference is now made to FIG. 1, which is a flowchart of a process for sorting seeds according to images of the seeds, in accordance with some embodiments of the present invention. Reference is also made to FIG. 2, which is a block diagram of components of a system 200 for classifying and/or clustering seeds according to images of the seeds, and/or for training neural networks for classifying and/or clustering the images of the seeds, in accordance with some embodiments of the present invention. System 200 may generate code instructions according to the automated classification and/or clustering based on output of the trained neural network(s), that when executed by a sorting device controller 201A causes a sorting device 202 to automatically sort the seeds. Reference is also made to FIG. 3, which is a flowchart of a process for training one or more neural networks for computing classification categories and/or embeddings according to seed images, in accordance with some embodiments of the present invention. System 200 may execute the acts of the method described with reference to FIG. 1 and/or FIG. 3, for example, by a hardware processor(s) 202 of a computing device 204 executing code 206A stored in a memory 206.

Sorting device 201 is designed to automatically, manually, and/or semi-automatically sort seeds. Sorting device 201 may be implemented, for example, as an assembly line of single seeds or groups of seeds that are sorted into different buckets. In another implementation, sorting device 201 may include a platform for storing seeds, and a robotic arm for selecting individual seeds for sorting. Sorting device 201 may include a mechanism for removal and/or disposal of certain seeds, for example, impure seeds.

Sorting device controller 201A may be implemented as, for example, a hardware processor(s) integrated within sorting device 201, an external computing device in communication with sorting device 201, and/or an external display that presents manual instructions for a user manually and/or semi-automatically operating sorting device 201.

Imaging sensor(s) 212 may be installed within and/or integrated with sorting device 201, for example, capturing images of the seeds for sorting by sorting device 201.

Imaging sensor(s) 212 may be located externally and/or independently of sorting device 201, for example, for capturing images of seeds for creation of training images 216 for training the neural network(s) described herein.

Exemplary imaging sensor(s) 212 include: RGB (red, green, blue), multispectral, hyperspectral, visible light frequency range, near infrared (NIR) frequency range, infrared (IR) frequency range, and combinations of the aforementioned.

Computing device 204 may be implemented as, for example, a client terminal, a virtual machine, a server, a virtual server, a computing cloud, a mobile device, a desktop computer, a thin client, a kiosk, and a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be integrated with sorting device 201 (i.e., controlled by controller 201A), for example, as a control console and/or control unit and/or instructions code stored within sorting device 201 for execution by a hardware processor(s) of the sorting device 201 (e.g., execution by controller 201A).

Computing device 204 may be implemented as a stand-alone device (e.g., kiosk, client terminal, smartphone, server) that includes locally stored code instructions 206A that implement one or more of the acts described with reference to FIG. 1. Computing device 204 is external to sorting device 201, and communicates with sorting device 201, for example, over a network, and/or by storing instructions on a data storage device that is then accessed by the controller 201A. The locally stored instructions may be obtained from another server, for example, by downloading the code over the network, and/or loading the code from a portable storage device.

Computing device 204 executing stored code instructions 206A, may be implemented as one or more servers (e.g., network server, web server, a computing cloud, a virtual server) that provides services (e.g., one or more of the acts described with reference to FIG. 1 to one or more client terminals 218 over a network 210. For example, providing software as a service (SaaS) to the client terminal(s) 218, providing software services accessible using a software interface (e.g., application programming interface (API), software development kit (SDK)), providing an application for local download to the client terminal(s) 218, providing an add-on to a web browser running on client terminal(s) 218, and/or providing functions using a remote access session to the client terminals 218, such as through a web browser executed by client terminal 218 accessing a web sited hosted by computing device 204. Each client terminal 208 may be associated with a respective sorting device and/or sorting device controller and/or imaging sensor 212, such that computing device 204 centrally generates instructions for sorting of seeds at respective remote sorting devices according to remotely acquired images.

It is noted that the training of the neural network(s), and the implementation of the trained neural network(s) to images of seeds, may be implemented by the same computing device, and/or by different computing devices, for example, one computing device trains the neural network(s) and transmits the trained neural network(s) to another computing device acting as a server and/or provides the trained neural network(s) for local installation and execution.

Computing device 204 receives images of seeds (also referred to herein as seed images) captured by imaging sensor(s) 212. Seed images captured by imaging sensor(s) 212 may be stored in an image repository 214, for example, data storage device 222 of computing device 204, a storage server, a data storage device, a computing cloud, virtual memory, and a hard disk. Training images 216 may be created based on the captured seed images, as described herein.

Training images 216 are used to train the neural network(s), as described herein. It is noted that training images 216 may be stored by a server 218, accessibly by computing device 204 over network 210, for example, a customized training dataset created for training the neural network(s), as described herein. Server 218 may create the trained neural network(s) by executing training code 206B and using training image(s) 216, as described herein.

Computing device 204 may receive the training images 216 and/or seed images from imaging device 212 and/or image repository 214 using one or more imaging interfaces 220, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)).

Hardware processor(s) 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include one or more processors (homogenous or heterogeneous), which may be arranged for parallel processing, as clusters and/or as one or more multi core processing units.

Memory 206 (also referred to herein as a program store, and/or data storage device) stores code instruction for execution by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code instructions for implementing trained neural network 222A. Memory 206 stores image processing code 206A that implements one or more acts and/or features of the method described with reference to FIG. 1, and/or training code 206B that executes one or more acts of the method described with reference to FIG. 3.

Computing device 204 may include a data storage device 222 for storing data, for example, one or more trained neural networks 222A (as described herein), and/or training images 216 and/or training datasets that include the training images (as described herein). Data storage device 222 may be implemented as, for example, a memory, a local hard-drive, a removable storage device, an optical disk, a storage device, and/or as a remote server and/or computing cloud (e.g., accessed over network 210). It is noted that trained neural network(s) 222A, and/or training images 216 may be stored in data storage device 222, with executing portions loaded into memory 206 for execution by processor(s) 202.

Computing device 204 may include data interface 224, optionally a network interface, for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may access one or more remote servers 218 using network 210, for example, to download updated training images 216 and/or to download an updated version of image processing code 206A, training code 206B, and/or the trained neural network(s) 222A.

Computing device 204 may communicate using network 210 (or another communication channel, such as through a direct link (e.g., cable, wireless) and/or indirect link (e.g., via an intermediary computing device such as a server, and/or via a storage device) with one or more of:

Sorting device 201 and/or controller 201A, for providing the generated instructions for sorting and/or clustering seeds. The instructions may be code instructions for automatic operation of sorting device 201 when executed by controller 201A and/or manual instructions for manual operation of sorting device 201 and/or controller 201A and/or manual instructions for programming sorting device 201 and/or controller 201A.

Client terminal(s) 208, for example, when computing device 204 acts as a server providing image analysis services (e.g., SaaS) to remote sorting devices.

Server 218, for example, storing training images and/or obtaining trained neural networks.

Image repository 214 that stores training images 216 and/or seed images outputted by imaging sensor(s) 212.

It is noted that imaging interface 220 and data interface 224 may exist as two independent interfaces (e.g., two network ports), as two virtual interfaces on a common physical interface (e.g., virtual networks on a common network port), and/or integrated into a single interface (e.g., network interface).

Computing device 204 includes or is in communication with a user interface 226 that includes a mechanism designed for a user to enter data (e.g., select target sorting parameter, such as desired seed purity level, designate comparison seed) and/or view the computed analysis (e.g., seed classification categories, text based instructions for manual operation of the sorting device 201). Exemplary user interfaces 226 include, for example, one or more of, a touchscreen, a display, a keyboard, a mouse, and voice activated software using speakers and microphone.

Optionally, a GUI 222B (e.g., stored by data storage device 222 and/or memory 206 of computing device 204) is presented on a display implementation of user interface 226. GUI 222B may be used, to select the sorting target and/or view images of selected seeds and/or view instructions for manual operation of the sorting device.

Referring now back to FIG. 1, at 102, one or more neural networks are trained and/or trained neural networks are provided.

Different neural networks may be trained and/or different neural networks are provided. For example, according to crop type, according to mother plant type, according to fruit type, according to image type (e.g., frequencies, number of channels), and/or according to classification categories.

The trained neural network(s) may be selected from multiple available trained neural networks. The selection may be performed manually by a user (e.g., via the GUI, for example, via a menu and/or icons of available neural networks). The selection may be performed automatically by code that analyzes, for example, the seed image, metadata of the seed image, obtains an indication of the hardware type of the imaging sensor(s), and/or obtains an indications of the type of seeds being imaged (e.g., from a database, from the sorting machine, from manual user entry). The selection may be according to the sorting target described with reference to act 104.

It is noted that act 102 and 104 may be integrated and executed as a single feature, executed in parallel, and/or act 104 may be executed before act 102.

The architecture of the neural network(s) may be implemented, for example, as convolutional, pooling, nonlinearity, locally-connected, fully-connected layers, and/or combinations of the aforementioned.

Exemplary classification categories include one or a combination of the following:

A non-visual category that cannot be manually determined based on visual inspection of the physical seed itself. For example, predicted phenotype (which will occur in the future and can't be determined now), and/or genotype (which may require a destructive DNA test that destroys the seed).

A non-visual category that cannot be determined based on automated visual analysis of the image of the seed, since standard visual features extracted from the seed are similar (within a tolerance range) to visual features extracted from another seed, for example, pixel values indicative of color, size of the seed, and/or texture of the seed.

A seed variant.

A classification category that is not directly correlated to DNA markers, for example, resistance to one or more viruses, predicted germination ratio, fruit taste, and fruit size.

A classification category that may be determined by a destructive test that destroys the seed. It is noted in at least some of the implementations of the systems, apparatus, methods, and/or code instructions described herein, the classification category is determined based on the image of the seed without performing the test on the seed and without destroying the seed. The classification category provides an indication and/or estimate of the results of a test which may otherwise be destructive, according to the image rather than performing the destructive test.

A prediction predicted to occur at a future time interval, for example, predicted to germinate, predicted to not germinate, and a probability indicative of germination.

An indication of infection, for example, is infected (with anything), infected with one or more viruses, infected with one or more fungi.

An indication of whether the seed is genetically modified (GMO), or non-GMO

An indication of whether the seed is haploid or diploid.

A prediction of one or more phenotypical properties, predicted to develop in the seed (or a plant growing from the seed) at a future time interval relative to a time interval when the image of the seed is captured. Exemplary phenotypical properties include: resistance to one or more viruses, predicted germination ratio, fruit taste, and fruit size.

The neural network(s) is trained according to a training dataset of training images. The training images depict different seeds that include the classification category and that do not include the classification category. Each training image is associated with an indication of the classification category, and optionally whether the classification category is absent, for example, by a tag, metadata stored in association with the training image, and/or as a value stored in a database.

An exemplary method of training the neural network(s) is described with reference to FIG. 3.

At 104, one or more sorting targets are provided. The sorting targets may be manually entered by a user (e.g., via the GUI, for example, selected from a list of available sorting targets), obtained as predefined values stored in a data storage device, and/or automatically computed (e.g., by a DNA testing device based on a sample of seeds).

Exemplary sorting targets include:

No sorting target is provided. In such cases, seeds are clustered according to embeddings computed by the embedding layer of the neural network. The clusters include seeds most similar to one another. Clusters different by a single feature or multiple features.

A binary feature for separating of seeds. Seeds that are similar to one another apart from a single feature may be separated. For example, self pollinated or hybrid pollinated (i.e., non-self pollinated), hybrid or non-hybrid, genetically modified or non-genetically modified, isogenic seeds that different according to the single feature, and seeds of a shared mother that different by paternal pollen.

One or more selected classification categories. Seeds meeting the classification categories are selectively sorted out from a mix of other seeds. Selection of the classification categories enables a user to select certain seeds to obtain desired properties. For example, the user may enter the classification category to select seeds that have a resistance to viruses. In another example, the user may enter the classification category to select seeds that produce a plant with tasty tomatoes. In yet another example, the user may enter the classification category to select seeds that produce a plant with high yield. In another example, the user may enter the classification category to remove foreign genetically modified seeds to obtain a batch of non-genetically modified seeds. In another example, self-pollinated seeds are sorted from a mixture of seeds. In another example, abnormal and/or non-germination seeds are removed from the mixture of seeds. In another example, infected seeds (e.g., with virus and/or fungus) are removed from the mixture.

An image of a target seed. The target seed may be a parent of the mix of seeds being analyzed, or a seed of a plant having desired properties. Other seeds determined to be similar to the target seed (e.g., having a statistical distance according to embedding of their images less than a threshold, as described with reference to act 110) may be clustered together. Providing the image of the seed enables selecting other similar seeds expected to have other similar classification categories without necessarily knowing how the desired plant obtained its traits.

A target ratio of classification categories, for example, for purity of seeds. For example, 95% purity. The target ratio may a percentage of the pure seeds in the seed lot. The target ratio may be obtained, for example, by performing destructive analysis of a sample of the seeds.

A target statistical distribution of classification categories. For example, 1:3:2 ratio of classification categories of Type 1:Type 2:Type 3. The target statistical distribution may be obtained, for example, by performing destructive analysis of a sample of the seeds. The target statistical distribution may be computed according to one or more provided target analysis value, for example, a target true positive, a target true negative, a target false positive, and a target false negative.

At 106, the image(s) of seed(s) are captured by the imaging sensor(s).

As used herein, the term target seed and target image (or target seed image) refer to the seed and image currently being analyzed and processed.

Exemplary imaging sensors include: RGB (red, green, blue), multispectral, hyperspectral, visible light frequency range, near infrared (NIR) frequency range, infrared (IR) frequency range, and combinations of the aforementioned.

One or more images of the seeds may be captured, for example, each image may be captured using a different imaging sensor, and/or at a different frequency. In another implementation, the image includes multiple channels, corresponding to different frequencies.

A single image may include multiple seeds, or a single image may include a single seed. Optionally, when the image includes multiple seeds, segmentation code is executed for segmenting each seed from the image, for example, based on color of seed versus background, based on computing a binary map, and/or based on edge detection. Sub-images, each including one seed may be created, where each sub-image is processed as described herein with reference to the seed image.

At 108, the target image(s) of the seed(s) are inputted into the trained neural network(s). Optionally, a single image of a single seed is processed, for example, sequentially. In some implementations, multiple images, each of a single seed, are processed in parallel.

The neural network(s) compute an indication of one or more classification categories for the physical seed depicted in the image. The indication of the classification categories may be outputted, for example, by the last layer of the neural network, for example, a fully connected layer.

The neural network computes the classification category at least according to weights of the trained neural network. In some implementations, explicitly defined features (e.g., based on visual and/or physical properties of the seed, such as color, size, shape, texture) may be extracted and analyzed in addition to the features automatically extracted according to weights of the trained neural network. In contrast to non-neural network statistical classifiers which at least extract explicitly defined features indicative of visual and/or physical properties of the seeds, the trained neural network(s) does not necessarily extract such explicitly defined features. Although the neural network may implicitly learn such features during training, but unlike training for non-neural network statistical classifiers such visual and/or physical features are not explicitly defined for the neural network. For example, non-neural network statistical classifiers extract visual features based on one or more physical properties of the seed, for example, hand-crafted features, size dimension(s) of the seed, color of the seed, shape of the seed, texture of the seed, combinations of the aforementioned, and the like. For seeds that are visually and/or physically similar to one another, but differ in other traits (e.g., predicted phenotype, small genetic difference), trained non-neural network statistical classifiers cannot compute the classification category for the seed with statistical significance (i.e., compute the classification category with statistical insignificance) based on explicitly defined visual and/or physical features, for example, classifying the seeds into the same classification category since the seeds have the same visual and/or physical features (within a tolerance requirement, e.g., threshold). Visual feature(s) extracted from one image of one seed are statistically similar (e.g., within the tolerance threshold) to corresponding visual feature(s) extracted from another image of another seed. In contrast, the neural network described herein is able to differentiate between the visually and/or physically similar seeds, to classify the seeds according to the difference trait.

Optionally, the image includes multiple seeds that are different from one another within a tolerance range by a single feature. The single feature cannot be extracted according to explicitly defined visual feature(s) extracted by non-neural network statistical classifiers, for example, the single feature is based on a predicted phenotype, and/or is not expressed by the seed in a manner that is visually and/or physically apparent. For such images, the traditional non-neural network statistical classifiers classify the images of the multiple seeds into a same classification category, and/or cannot classify the images of the seeds (e.g., output error or statistically insignificant category, since the single feature cannot be extracted by the at least one visual features). The classification category may be a binary classification category indicating whether the respective seed includes the single feature or does not include the single feature. Exemplary binary classification categories indicative of the single feature or lack thereof include: self pollinated or hybrid pollinated (i.e., non-self pollinated), genetically modified or non-genetically modified, isogenic seeds that different according to the single feature, and seeds of a shared mother that different by paternal pollen.

The indication of the classification categories outputted by the trained neural network(s) may be an absolute classification category, and/or a probability of falling into one or more classification categories.

The neural network(s) may compute an embedding for the seed image. The embedding may be stored as a vector of a predefined length. The embedding may be outputted by an embedding layer of the neural network, which may be the same neural network trained to output the classification category. The embedding layer may be an intermediate and/or hidden layer of the neural network trained to output the classification category. Layers after the embedding layer may be removed from the neural network, such that the embedded values are outputted by the embedding layer acting as the final layer.

Optionally, the classification category is determined according to an annotation of an identified embedded image that is similar to the embedding computed for the target seed image being analyzed. The embedded image may be obtained from the training dataset storing embeddings of the training images computed by the embedding layer of the trained neural network. The similar embedded image may be identified according to a requirement of a similarity distance between the embedding of the target image and the embedding of the training image. The similarity distance may be computed as a distance between a vector storing the embedding of the target image and each vectors each storing embedding of respective training images. Alternatively, the similarity distance is computed between the embedding of the target image and a cluster of embeddings of training images each associated with the same classification category. The distance may be computed to the center of the cluster, and/or edge of the cluster.

The similarity distance may be computed as the L2 norm distance. For example, the vector representation of embeddings of the training images that is closest (i.e., minimal distance) to the vector representation of the embedding of the target seed image is found. The classification category of the closest embedded training image is extracted and outputted as the classification category of the target seed.

At 110, multiple images (and/or embeddings thereof) of multiple seeds of different classification categories (and/or different embeddings) may be clustered.

When multiple images are received, each of a single seed of a respective classification category, clusters are created according to the images, where images classified into the same classification category are in the same cluster. Alternatively or additionally, the images of the seeds are clustered according to the embeddings computed for each seed image. The vector representations of the embeddings may be clustered by clusterization code, for example, vectors closest together within an N-dimensional space (where N is the predefined vector length) are clustered together. Distances between images of the cluster may be computed as statistical distances between embeddings of the images computed by the embedding layer of the trained neural network, optional between vector representations of the embeddings, for example, L2 norm distances between the vector representations of the embeddings. The seeds may be physically clustered according to the created clusters by the sorting machine according to generated instructions for sorting the seeds corresponding to the clusters (e.g., as described with reference to act 112).

Optionally, the clusters are computed such that each embedded image member of each respective cluster is at least a threshold distance away from another cluster. Alternatively or additionally, the clusters are computed such that each embedded image member of each respective cluster is less than a threshold distance away from every other member of the same respective cluster. The threshold distance is selected, for example, to define the amount of tolerance of similarity between members of the cluster, and/or to define the amount of tolerance of difference between members of different clusters. Alternatively or additionally, an intra-cluster distance computed between embeddings of a same cluster is less than an inter-cluster distance computed between embeddings of different clusters. The distances between embeddings of the same cluster is less than the distance between one cluster to another cluster (e.g., distance between any embeddings of one cluster and any embeddings of another cluster) to prevent overlaps between clusters, and/or to ensure that members of the same cluster are more similar to one another than to members of another cluster.

Optionally, the clusterization is performed according to a target ratio of classification categories. Members of the clusters are arranged according to the target ratio. The target ratio may be provided with reference to act 104. For example, the target ratio may be for 95% purity of seeds. The clusterization is performed such that 95% of the seeds identified as pure are within the cluster, and the rest are excluded. For example, 95% of the embeddings of the images of the seeds that are closest together are selected for the cluster. In another example, the target ratio of the classification categories is computed according to a destructive DNA analysis of a sample of the seeds. For example, a sample of a large pool of seeds is sent for destructive DNA testing, which provides the result that the sample is 94% pure. The target ratio for clustering the rest of the seed pool is set to 94%. The remaining seeds are clustered according to their respective images to the target ratio without performing additional destructive testing.

Optionally, when the respective classification categories include a classification category (e.g., binary indication) of seed purity or seed impurity, the images are clustered into a seed purity cluster indicative of seeds classified as pure, or into a seed impurity cluster indicative of seeds classified as impure. Optionally, the clusterization into the seed purity cluster or seed impurity cluster is performed according to a target statistical distribution, which may be provided for example, as described with reference to act 104. The target statistical distribution may be computed according to one or more of the following (which may be provide, for example, as described with reference to act 104): a target true positive, a target true negative, a target false positive, a target false negative, a manually entered distribution, and a distribution measured according to a DNA test (which may or may not be destructive to the seeds) performed on a sample of the seeds. The threshold(s) for clustering (e.g., the encodings of the image, and/or a probability value associated with the classification category) is set according to the target statistical distribution.

Optionally, an indication of a ratio of classification categories is computed according to the training images stored by the training dataset.

Optionally, the clusterization is performed for seeds that are similar to one another, for example, seeds that are visually and/or physically similar to one another within a tolerance range, as described herein. Alternatively or additionally, the clusters of different classification categories are created for seeds are grown under same environmental conditions. Alternatively or additionally, the clusters of different classification categories are created for seeds are grown at a same growing season. Alternatively or additionally, the clusters of different classification categories are created for seeds grown at a same geographical location. Alternatively or additionally, the clusters of different classification categories are created for seeds having identical physical parameters within a tolerance range. Exemplary physical parameters include one or a combination of: color, texture, size, area, length, roundness, width, thousand seed weight, and combinations of the aforementioned.

Optionally, the seeds are isogenic, and the clusterization is performed to separate seeds (according to their images) with the single trait and seeds without the single trait.

Alternatively or additionally, the seeds are from a same mother but different paternal pollen, and the clusters are computed according to the different paternal pollen, where seeds of each cluster are of the same paternal pollen.

Alternatively or additionally, the seeds include self-pollinated and hybrid seeds, and the clusters are computed according to self-pollinated and hybrid indications, where seeds of one cluster are self-pollinated and seeds of another cluster are hybrid.

Alternatively or additionally, the seeds include non-hybrid and hybrid seeds, and the clusters are computed according to non-hybrid and hybrid indications, where seeds of one cluster are non-hybrid and seeds of another cluster are hybrid.

Optionally, embeddings are clustered into an abnormal cluster when the embeddings are located above an abnormality distance threshold from another embedding associated with a defined classification category (i.e., indicative of normal, or not abnormal seed), and a cluster of embeddings (e.g., indicative of normal, or not abnormal seeds, or the fact that a cluster is created from the embeddings is indicative that the seeds members are normal). The abnormal cluster stores embeddings indicative of abnormal seeds. The abnormal seeds may be selectively removed from the seed lot by the sorting machine according to generated sorting instructions (e.g., as described with reference to act 112).

Optionally, seeds denoted as abnormal are assigned a new classification category. The abnormal seeds may be determined to be a new type of normal seed (e.g., which is to be sorted), rather than a completely abnormal seed (e.g., which needs to be discarded). The abnormality distance may include two thresholds. A first threshold indicative of completely abnormal seeds. Embeddings located far away from another embedding (i.e., indicative of normal and/or not abnormal seed) and/or from a cluster, above the first abnormality distance threshold, are indicative of abnormal seeds, for example, which are to be discarded. Embeddings located relatively closer, but still away from another embedding (i.e., indicative of normal and/or not abnormal seed) and/or from a cluster, above a second abnormality distance threshold, but below the first abnormality distance threshold, are indicative of a seed with new classification category, for example, which are to be sorted. The images and/or embeddings identified as being associated with a new classification category may be added to the training dataset for updating the trained neural network. For example, an indication of the new seed type may be presented on a GUI, and the user asked to manually enter the classification category. Alternatively or additionally, the new classification category is automatically computed according to the classification categories assigned to two or more image embeddings and/or two or more clusters in closest proximity to the embedding of the seed denoted as abnormal and/or indicative of new classification category. The new classification category may be computed based on the relative distances to the nearest image embeddings and/or clusters. For example, when the distance is split as 75% to the nearest cluster of Type-1 seeds, and 25% to the nearest cluster of Type-2 seeds, the new image and/or embedding is associated with a classification category of 75% Type-1 25% Type-2.

Optionally, a certain seed is denoted as abnormal when the embedding of the image of the certain seed is statistically different from all other clusters. The statistical difference may be according to the value(s) of the embedding relative to the statistical value(s) computed for each cluster. Alternatively or additionally, the certain seed is assigned a certain classification category of a certain cluster when the embedding of the image of the certain seed is statistically similar to the cluster, optionally when one or more values computed for the embedding are similar to the statistical value(s) computed for the cluster. Exemplary statistical values computed for the cluster include: element wise mean of the embedding of the respective cluster (e.g., a mean vector representation where each element of the vector is the mean of corresponding values of the embeddings vectors of the cluster), variance of the embeddings of the respective cluster (e.g., element wise variance of the different vectors for the respective cluster), and higher moments of the embeddings of the respective cluster. For example, when the vector representation of the embedding is different than 99% of the vectors of all clusters, the embedding (and corresponding seed) is denoted as abnormal.

Optionally, when an image of a target seed is provided (e.g., as described with reference to act 104) in addition to a lot of mixed seeds, seeds that are similar to the target seed are selected from the lot. The image of the target seed is embedded by the neural network(s). A sub-set of image embeddings located less than a target distance threshold away from the embedding of the target seed are selected. The generated instructions for execution by the sorting controller include instructions for selecting seeds corresponding to the selected sub-set of the image embeddings. In another implementation, the image embeddings and the embedding of the target seed are clustered. The cluster that includes the target seed is selected. The instructions for execution by the sorting controller include instructions for selecting seeds out of the seed mix that correspond to the selected cluster.

At 112, instructions for execution by a sorting controller of a sorting device for sorting of the seeds are generated according to the indication of the classification category (or categories) and/or according to the created clusters (e.g., of the embeddings and/or images). The instructions are for sorting of the physical seeds corresponding to the analyzed seed images. Optionally, the instructions include instruction for discarding certain seeds, for example, seeds classified as impure and/or abnormal (and/or for which no new classification category is created).

The instructions may be, for example, for selecting certain seeds from a mix of seeds. The seeds may be arranged on a surface of a tray and/or platform. The physical location of each seed on the platform is mapped to the image of the seed, for example, to a segmented sub-portion of the image including multiple seeds on the platform. When each image of each seed is computed to determine its respective classification category and/or cluster, a robotic arm may select the seed according to the physical location mapped to the image. The robotic arm may then place each seed in a receptacle corresponding to the appropriate classification category and/or cluster.

In another implementation, the instructions may be for seeds arriving single file on a conveyor belt. Each seed may be imaged. An appropriate receptacle corresponding to the classification category and/or cluster of the image corresponding to the seed is positioned such that the seed enters the appropriate receptacle. For example, the conveyor belt is moved to the receptacle, or the appropriate receptacle is positioned at the end of the conveyor belt.

The instructions may represented as code for automated execution by the controller, for example, as binary code, as a script, as human readable text, as source code, as compiled code, and/or as function calls. Alternatively or additionally, the instructions may be formatted for manual execution by a user, for example, the user manually programs the sorting machine based on the instructions. For example, the instructions are presented on a display (e.g., as text, as a movie, and/or as graphical illustrations) and/or printed.

Optionally, the instructions are generated in real time, for example, for execution by a dynamic sorting machine into which seeds are fed (e.g., continuously, or periodically), imaged, and dynamically sorted in real time.

At 114, the seeds are sorted according to the computed classification categories and/or clusters. The sorting may be automatically performed by the sorting device directed by the sorting controller executing the generated sorting instructions.

At 116, one or more acts described with reference to blocks 104-114 are iterated. For example, the iterations may be performed for each image. Each image of each seed is independently analyzed to determine the corresponding classification category, and the seed is sorted according to the classification category. In another example, the iterations may be performed for multiple images of multiple seeds, such as a batch of a mixture of seeds. The images of individual seeds are analyzed together (e.g., in parallel, or sequentially with intermediate results being stored) for clustering the images (e.g., embeddings of the images). The seeds of the lot are sorted according to the clusters.

Referring now to FIG. 3, at 302, multiple training images of different seeds are provided. Optionally, the images are segmented such that each segmented image includes a single seed. The images may be acquired by different types of imaging sensors. The images include seeds of different classification categories.

At 304, each training image is annotated with one or more classification categories. The annotation may be performed manually by a user (e.g., via a GUI that presents the image of the seed and accepts the classification category as input from the user, for example, selection from a list, or manually entering the classification category), and/or automatically obtained by code, for example, from a device that performs an automated analysis of the seed (e.g., DNA analyzer).

Optionally, when the classification category is a seed variant, the classification category may be determined according to the variant of the parent plant. In such a case the classification category is determined without affecting the seed itself. Alternatively, the classification category may be determined based on a destructive test that destroys the seed, for example, a DNA test that obtains the genotype of the seed. In such case, the seed is first imaged before being destructively tested. The destructive test may be performed when the variant of the parent plant is unknown.

Optionally, the classification category is a new category of a new seed variant, detected as described with reference to act 110 of FIG. 1. The image may be automatically annotated with the new classification category.

At 306, one or more training datasets are crated based on training images and associated classification categories. The training datasets may be defined according to target neural networks, for example, according to type of imaging sensor, and/or according to number of classification categories classified by the neural network. For example, a single neural network is trained per classification category, or a single neural network is trained to classify into multiple candidate classification categories.

At 308, one or more neural networks are trained according to the training dataset(s). The neural networks are trained for computing an indication of classification categories according to a target image of a seed captured by an imaging sensor.

Optionally, existing neural networks are retrained and/or updated according to additional annotated training images, such as when new variant types are detected.

Neural network(s) may be trained according to a loss function. The loss function may be measured for the neural network output over the seed images, to estimate the measure of consent between the network outputs and the real labels of the seed images. An example of a loss function is softmax loss. An optimization process (e.g., stochastic gradient descent) may be used to minimize the loss function. The optimization process may be iterated until a stop condition is met.

At 310, one or more embedding neural networks may be created based on the trained neural networks. The embedding neural network may be created by selecting an inner hidden layer of the trained neural network as the embedding layer, and removing the layers after the embedding layer.

Optionally, existing embedding neural networks are retrained and/or updated according to additional annotated training images, such as when new variant types are detected.

At 312, the trained neural networks and/or embedding networks are provided, for example, stored by the computing device and/or provided to remote computing devices for local implementation. Optionally, the weights of the neural network are provided.

Reference is now made to FIGS. 4A-4E, which are dataflow diagrams of exemplary dataflows based on the methods described with reference to FIGS. 1 and/or 3, executable by components of system 200 described with reference to FIG. 2, in accordance with some embodiments of the present invention.

Figure 4A:
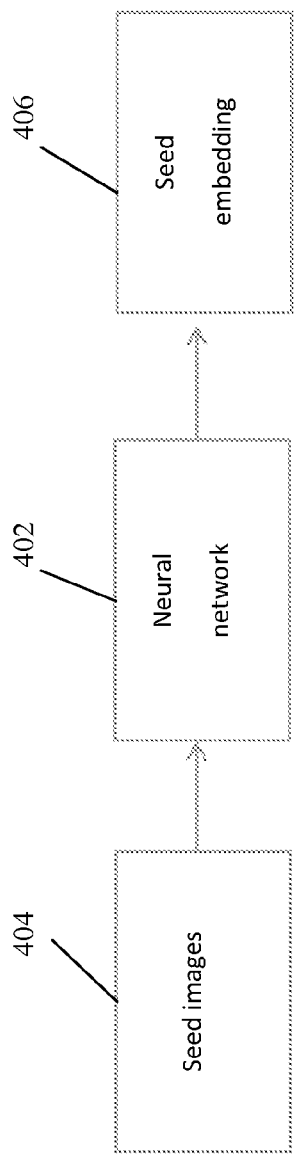

FIG. 4A depicts a dataflow for training an embedding neural network 402 according to training seed images 404 to compute embeddings of the seed images 406, in accordance with some embodiments of the present invention.

Figure 4B:
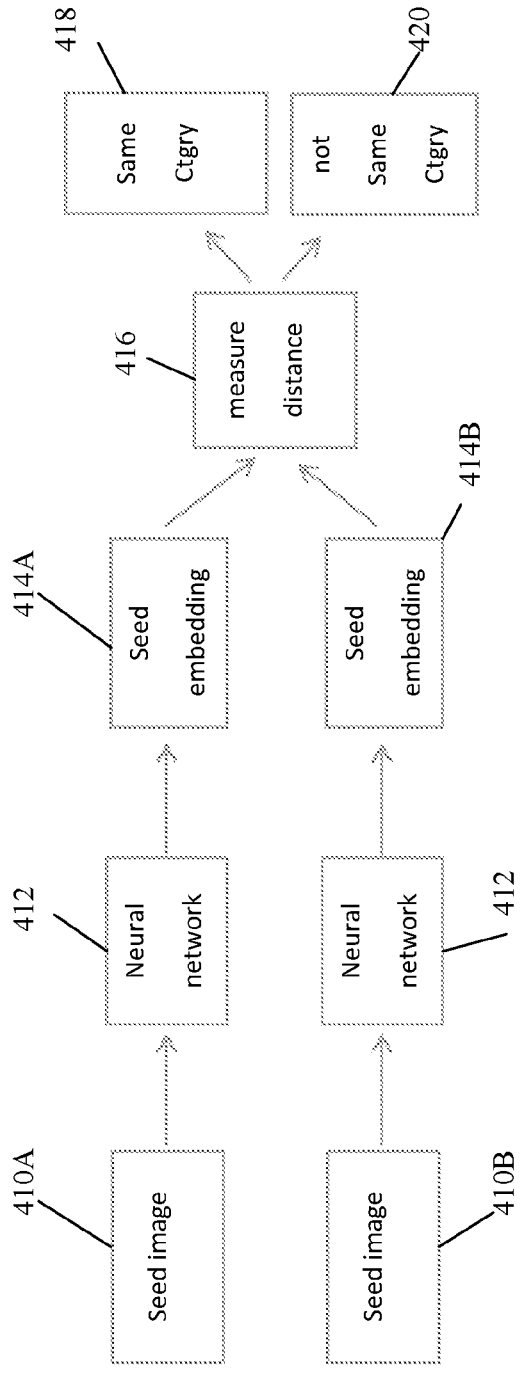

FIG. 4B depicts a dataflow for determining whether two seeds are of the same category or not. Seed images 410A-B of the two seeds are fed into a neural 412 for computation of respective embeddings 414A-B. A distance 416 between embeddings 414A-B is computed, for example, as the L2 norm distance between vector representations of the embeddings. The determination of whether the seeds are of a same category 418 or of different category 420 is made according to the distance 416, for example, when the distance is below a threshold the seeds are of same category 418, and of different category 420 when the distance is above the threshold.

Figure 4C:
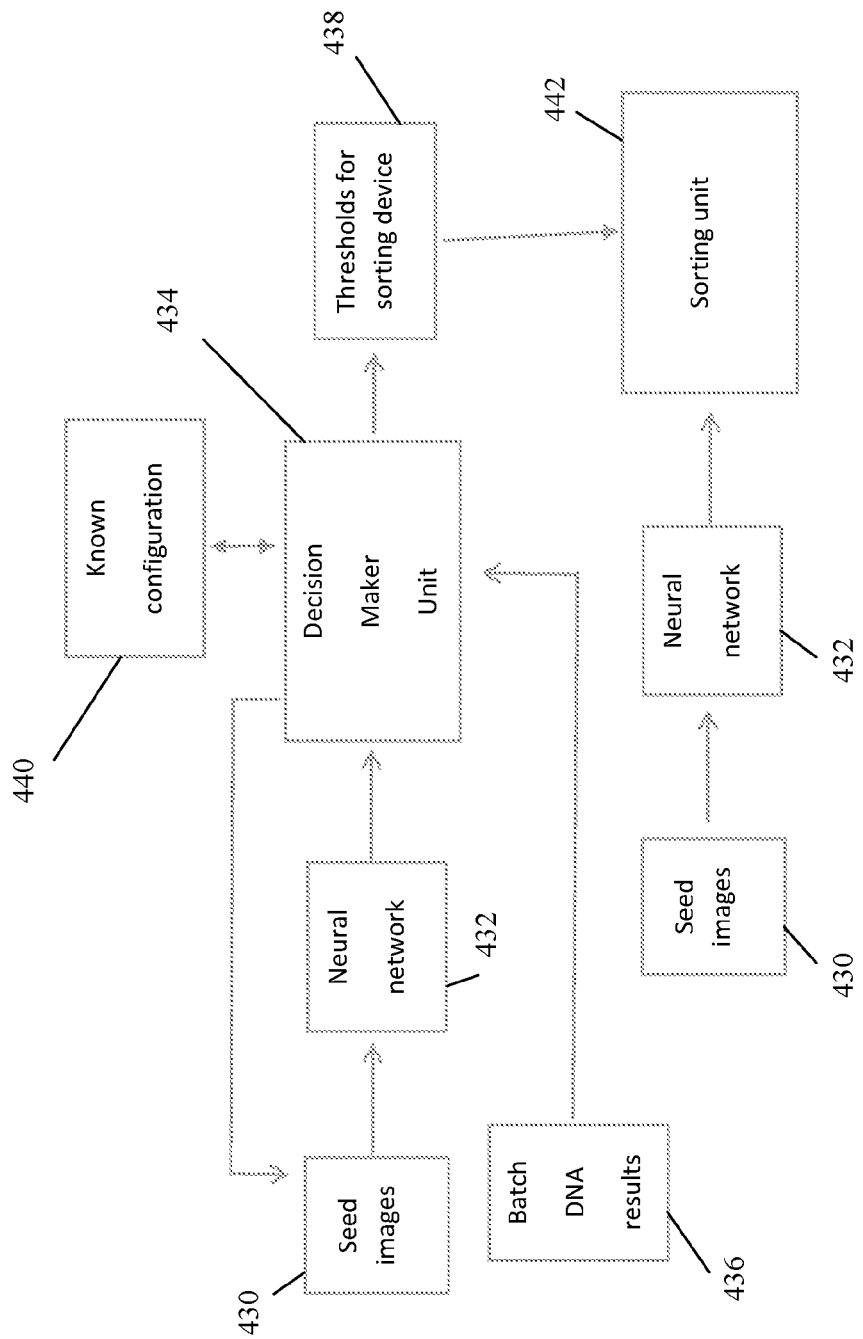

FIG. 4C depicts a dataflow for improving purity results of seed batches according to DNA testing. Seed images 430 are fed into a trained neural network 432, which outputs classification indications and/or embeddings into a decision making unit 434. Decision making unit 434 receives as input DNA results 436 of a sample of the seeds generated by a DNA testing device. Decision making unit 434 computes sorting thresholds 438 for sorting the seed images based on known statistical configurations 440. Decision making unit 434 provides sorting unit 442 with instructions of which seeds to discard and/or which seeds should remain to obtain the predetermined purity level. Sorting unit 434 may receive a mapping between the seeds for sorting and corresponding seed images 430 processed by neural network 432 for determining which seeds to remove and/or which seeds to leave.

FIG. 4D depicts a dataflow for defining statistics of a target seed hybrid/non-hybrid category. Multiple images for each of multiple target seed category 450 are fed into a neural network 452, which computes embeddings 454 for each image. Statistics 456 are computed for the embeddings, as described herein.

FIG. 4E depicts a dataflow for determining whether a target seed is of the same category as the seeds of FIG. 4D or not. An image 460 of the new target seed is fed into neural network 452 (of FIG. 4D) for computation of an embedding 462. The embedding is evaluated with category statistics 456 (computed as described with reference to FIG. 4D) to determine whether the new target seed is of a same category 464 as category samples 450 of FIG. 4D, or not of the same category 466.

Various embodiments and aspects of the present invention as delineated hereinabove and as claimed in the claims section below find calculated support in the following examples.

EXAMPLES

Reference is now made to the following examples of training the neural network(s) and classifying and/or clustering seeds according to an analysis of images of the seeds by the trained neural network, which together with the above descriptions illustrate some implementations of the systems, methods, apparatus, and/or code instructions described herein in a non limiting fashion.

Inventors performed experiments, which included growing real seeds, and analyzing the seeds according to at least some implementations of the systems and/or methods and/or apparatus and/or code instructions described herein, based on the features and/or system components discussed with reference to FIGS. 1-3.

Example 1

Hybrid (F1) Classification

Materials & methods: Seed samples: Seeds of F1 variants of tomato, pepper, corn melon and cucumber were taken. Nine Tomato hybrids were produced in the same season in a green house under the same environmental conditions. All seeds were treated the same way and went through the same processes, based on methods known in the art. Five Tomato hybrids were produced in the same season in a greenhouse under the same environmental conditions. All seeds were treated the same way and went through the same processes, based on methods known in the art. Seven corn hybrids were produced under the same environmental conditions in the same season. All seeds were treated the same way and went through the same processes, based on methods known in the art. Three melon hybrids were produced under greenhouse conditions in the same season. All seeds were treated the same way and went through the same processes, based on methods known in the art. Another three melon hybrids were produced under greenhouse conditions in the same season. All seeds were treated the same way and went through the same processes, based on methods known in the art. Three pepper hybrids were produced in the same season in a greenhouse under the same environmental conditions. All seeds were treated the same way and went through the same processes, based on methods known in the art. Three Cucumber hybrids were produced in the same season in a greenhouse under the same environmental conditions. All seeds were treated the same way and went through the same processes, based on methods known in the art.

Image Acquisition and Analysis: Hundreds of seeds from each hybrid were analyzed by RGB imaging sensor. For each hybrid, the images were split randomly into three groups, training, validation and test of 80%/10%/10% respectively. This process was repeated 10 times for each hybrid. A convolutional neural network was trained using the training set. The trained neural network was used to predict the seed variant for the validation and test sets images. For each seed image of these sets, the neural net outputs probabilities for the seed to belong to the trained hybrid. The hybrid with the highest probability was selected. The percentage of correct predictions for each hybrid was stored. This process was repeated 10 times with different random splits.

Results: Using data obtained from RGB imaging sensors, the seed hybrid was correctly classified with more than 96% accuracy for each of the different crops, tomato, corn, pepper, cucumber and melon. In tomato, eight hybrids were tested, and the average variety identification was over 98% identity, GS13-97.14%, GS16-98.15%, GS19-100%, GS27-100%, GS3-97.62%, GS4-97.14%, GS5-96.5%, GS6A-96.67% and GS6B-100% accuracy. Another 5 tomato hybrid were grown in second location, and the variety identification was over 96% identity, ISO56 98.5%, ISO57 98.7%, ISO89 98.57%, ISO60 96.85%, ISO61 98.6%. In corn, seven hybrids were tested, and the variety identification was 100% for six hybrids, TS, TS1, TS-bon, TS-0, TS-nal, TS-ro and 92% identity for TS-line. In melon, three hybrids were tested, and the variety identification was 99, 98.67, and 99.34%. Another 3 melon hybrids were grown in second location, and the variety identification was over 86% identity, ISO52 88.11%, ISO53 86.59%, ISO54 94.57%. In pepper, three hybrids were tested, and the variety identification was over 98%, ISO66 98.2%, ISO67 100%, ISO68 100%. In cucumber, three hybrids were tested, and the variety identification was over 99%, G101 99.1%, G501 98.2%, G601 99.1%.

Example 2

Open Line Classification

Materials and Methods: Seed samples: Seeds of open lines (OP's) of wheat soy and lettuce were taken. Seven wheat OP's were grown in the field under the same conditions, and in the same season. All seeds were treated the same way and went through the same processes, based on methods known in the art. Four soy OP's were grown in the field under the same conditions, and in the same season. All seeds were treated the same way and went through the same processes, based on methods known in the art. Two lettuce OP's were grown in the field under the same conditions, and in the same season. All seeds were treated the same way and went through the same processes, based on methods known in the art.

Image Acquisition and Analysis: Hundreds of seeds from each hybrid were analyzed by RGB imaging sensor. For each hybrid, the images were split randomly into three groups, training, validation and test of 80%/10%/10% respectively. This process was repeated 10 times for each hybrid. A convolutional neural network was trained using the training set. The trained neural network was used to predict the seed variant for the validation and test sets images. For each seed image of these sets, the neural net outputs probabilities for the seed to belong to the trained hybrid. The hybrid with the highest probability was selected. The percentage of correct predictions for each hybrid was stored. This process was repeated 10 times with different random splits.

Results: Using data obtained from RGB imaging sensors, the correct seed hybrid was correctly classified are more than 98% accuracy for different crops, wheat, soy and lettuce. In wheat, seven OP's were tested, and the variety identification was over 95% identity, EC122-97.67%, EC404-95.75%, EC431-95.92%, EC-646 100%, EC647-97.87%, EC651-97.78%, EC760-95.65%, accuracy. In soy, four OP's were tested, and the variety identification was over 98% identity, E298-100%, E311-100%, E506-93.3%, E619-100% accuracy. In lettuce, two OP's were tested, and the variety identification was over 98% identity, GSJ1-98.9%, and GS2-98% accuracy.

Example 3

Distinguishing Between Hybrid and Self

Materials & methods: Seed samples. Hybrids and their female parental line (self), of 8 tomato different hybrids were produced in a greenhouse under the same environmental conditions and in the same season. For each variant some flowers were chosen randomly for self-pollination and the rest were cross pollinated to create the hybrid seeds. All seeds were treated the same way and went through the same processes, based on methods known in the art. Three melon different hybrids were produced in a greenhouse under the same environmental conditions and in the same season. For each variant some flowers were chosen randomly for self-pollination and the rest were cross pollinated to create the hybrid seeds. All seeds were treated the same way and went through the same processes, based on methods known in the art. Three pepper different hybrids were produced in a greenhouse under the same environmental conditions and in the same season. For each variant some flowers were chosen randomly for self-pollination and the rest were cross pollinated to create the hybrid seeds. All seeds were treated the same way and went through the same processes, based on methods known in the art. Three corn different hybrids were produced in a field under the same environmental conditions and in the same season. For each hybrid, some inflorescents were chosen randomly for self-pollination and the rest were cross pollinated to create the hybrid seeds. All seeds were treated the same way and went through the same processes, based on methods known in the art.

Image Acquisition and Analysis. Samples of at least 1000 seeds from each hybrid and its female parental line were analyzed by RGB imaging sensor(s). For each sample, images were split randomly to three groups, training, validation and test of 80%/10%/10% respectively. This process was repeated 10 times for each sample. A convolutional neural network was trained using the training set. The trained neural network was used to predict the seed variant for the validation and test sets images. For each seed image of these sets, the neural net outputs probabilities for the seed to belong to the trained hybrid and the parental lines. Each pair of lines, hybrid and its own maternal line were compared and the percentage of correct predictions for each pair was saved.

Results: This example demonstrates the classification of self-pollinated seeds from the required hybrid seed, which is the most common production impurity. Using data obtaining from RGB imaging, the correct seed hybrid was predicted from its own parental line, self-compare to the hybrid. In tomato, 8 pairs were tested, and the variety identification was more than 95% accurate in 7 out of the 9 pairs. ET50-87.6 for the hybrid and 96.2% for the self, ET51-88.5 for the hybrid and 96.6 for the self, ET52-96.8 for the hybrid and 100% for the self, ET53 96.72, ET53-90.67 for the hybrid and 98.5 for the self, ET54 96.7% for the hybrid and 98.4% for the self, ET56-87.3% for the hybrid and 94.5% for the self, and ET57-94% for the hybrid and 96.9% for the hybrid. In melon, three pairs were tested, and the variety identification was more then 89.7% accurate. ISO52-88% for the hybrid, ISO53-86.6% and ISO54 94.6% for the hybrid and 98.1% for the self. In pepper, three pairs were tested, and the variety identification was more than 99% accurate. ISO66-100% for the hybrid and 100% for the self, ISO67-100% for the hybrid and 98.9% for the self and ISO68 97.6% for the hybrid and 90.1% for the self. In corn, two pairs were tested, the variety identification for SH1-94.9% for the hybrid and 89% for the self, SH2-84.7% for the hybrid and 90.9% for the self.

Example 4

Identified Between Isogenic Lines

Materials & methods: Seed samples: Pairs of isogenic lines from tomato, pepper and melon plants were taken. Six pairs of melon isogenic lines were grown under greenhouse conditions in the same season. All seeds were treated the same way and went through the same processes, based on methods known in the art. Three pairs of pepper isogenic lines were grown under greenhouse conditions in the same season. All seeds were treated the same way and went through the same processes, based on methods known in the art. Six pairs of tomato isogenic lines were grown under greenhouse conditions at the same season. All seeds were treated the same way and went through the same processes, based on methods known in the art.

Image Acquisition and Analysis: Samples of at least 1000 seeds from each isogenic line were analyzed by the RGB imaging system. Images from each seed sample were captured using specialized RGB photography. For each sample, images were split randomly to three groups, training, validation and test of 80%/10%/10% respectively. This process was repeated 10 times for each sample. A convolutional neural network was trained using the training set. The trained neural network was used to predict the seed variant for the validation and test sets images. For each seed image of these sets, the neural net was used to output probabilities for the seed to belong to the trained isogenic lines. The sample with the highest probability was chosen. The percentage of correct predictions for each sample was saved.

Results: This example demonstrates the classification of pairs of isogenic lines seeds, which are two lines sharing high genomic identity. Using data obtained from RGB imaging, the correct seed isogenic line was predicted. In melon 6 pairs of isogenic lines were tested, and the variety identification was at ISO1 vs. ISO2-95.2%, ISO3 vs. ISO4-90.8%, ISO5 vs. ISO6-95.8%, ISO7 vs. ISO8 99.4%, ISO9 vs. ISO10-100%, ISO11 vs. ISO12-96.7%. In pepper 3 pairs of isogenic lines were tested, and the variety identification was at ISO13 vs. ISO14-98.9%, ISO15 vs. ISO16-99.3%, ISO17 vs. ISO18-98.6%. In Tomato 6 pairs of isogenic lines were tested, and the variety identification was at ISO19 vs. ISO20-99%, ISO21 vs. ISO22-95.5%, ISO23 vs. ISO24-94.5%, ISO25 vs. ISO26 97.6%, ISO29 vs. ISO30-96.8%, ISO31 vs. ISO 32-5.7%.

Example 5

Biotic Trait Classification

Materials & methods: Seeds samples. Pairs of seeds were taken that represent different biotic traits:

Two tomato similar lines, one resistant and the other sensitive to TYLCV. The two isogenic lines were grown under similar growth conditions.

Two tomato similar lines, one resistant and the other sensitive to TMV resistance. The two isogenic lines were grown under similar growth conditions.

Two tomato similar lines, one resistant and the other sensitive to TSWV. The two isogenic lines were grown under similar growth conditions.

Two tomato similar lines, one resistant and the other sensitive to Nematode. The two isogenic lines were grown under similar growth conditions.

Two tomato similar lines, one resistant and the other sensitive to Nematode (other genetic background). The two isogenic lines were grown under similar growth conditions.

Two melon similar lines, one resistant and the other sensitive to Powdery Mildew (Fungus). The two isogenic lines were grown under similar growth conditions.

Image Acquisition and Analysis: Samples of at least 1000 seeds from each pair of lines were analyzed by RGB imaging sensors. The training and results evaluation of the previous experiments were used, and the results are presented below.

Results. The results of this experiment demonstrated the ability to separate between two seed types with a very small genetic difference between them.

For the experiment with the two tomato lines, using data obtained from RGB imaging sensors, the seeds were successfully separated at a very high accuracy into TYLCV sensitive and resistant seeds, 100% accuracy for the resistant seeds and 95.45% accuracy for the sensitive seeds.

For the experiment with the two tomato lines, the seeds were successfully separated at a very high accuracy into TM sensitive and resistant seeds, 94.5% accuracy for the resistant seeds and 95.6% accuracy for the sensitive seeds.

For the experiment with the two tomato lines, the seeds were successfully separated at a very high accuracy into TSWV sensitive and resistant seeds, 95.45% accuracy for the resistant seeds and 100% accuracy for the sensitive seeds.

For the experiment with the two tomato lines, the seeds were successfully separated at a very high accuracy into Nematode sensitive and resistant seeds, 92.4% accuracy for the resistant seeds and 96.8% accuracy for the sensitive seeds.

For the experiment with the two tomato lines, the seeds were successfully separated at a very high accuracy into Nematode (other genetic background) sensitive and resistant seeds, 95.7% accuracy for the resistant seeds and 90.6% accuracy for the sensitive seeds.

For the experiment with the two melon lines, the seeds were successfully separated at a very high accuracy into Powdery Mildew sensitive and resistant seeds, 96.7% accuracy for the resistant seeds and 96.6% accuracy for the sensitive seeds.

Example 6

A-Biotic Trait Classification

Materials & methods: Seed samples. Eggplant varieties representing different resistances to drought were selected. The plants were grown under similar growth conditions.

Image Acquisition and Analysis: Samples of at least 1000 seeds from each pair of line are analyzed by RGB imaging sensors. The training and results evaluation of the previous experiments are used, results expect within the coming months.

Example 7

Plant Structure and Quality Trait Classification

Materials & methods: Pairs of seeds with different trait genes were taken. Two pepper similar lines, (one presenting red fruit color and the second yellow color) were analyzed. The two isogenic lines were grown under similar growth conditions.

Two peppers similar lines, (one presenting small fruit size and the second larger fruit size) were analyzed. The two isogenic lines were grown under similar growth conditions.

Two peppers similar lines, (one presenting a determinate plant and the second an indeterminate plant) were analyzed. The two isogenic lines were grown under similar growth conditions.

Two tomato similar lines, (one presenting red fruit color and the second orange color) were analyzed. The two isogenic lines were grown under similar growth conditions.

Two tomato similar lines, one presenting red fruit color and the second purple color) were analyzed. The two isogenic lines were grown under similar growth conditions.

Two tomato similar lines, (one presenting oval fruit structure and the second presenting round fruit structure) were analyzed. The two isogenic lines were grown under similar growth conditions.

Two tomato similar lines, (one presenting a compact plant and the second presenting a non-compact plant) were analyzed. The two isogenic lines were grown under similar growth conditions.

Two melon similar lines, (one presenting a white, pale color and the second a yellow color) were analyzed. The two isogenic lines were grown under similar growth conditions.

Two melon similar lines, one presenting high PH (good taste) and the second low PH (poor taste) were analyzed. The two isogenic lines were grown under similar growth conditions.

Two melon similar lines, (one presenting white flesh color and the second yellow flesh color) were analyzed. The two isogenic lines were grown under similar growth conditions.

Image Acquisition and Analysis: Samples of at least 1000 seeds from each pair of line were analyzed by RGB imaging sensors. The training and results evaluation of the previous experiments were used, and the results are presented below.

Results: The results of this experiment demonstrated the ability to separate between two seed types with a very small genetic difference between them.

Quality traits: For the experiment with the two similar pepper lines, using data obtained from RGB imaging sensors, the seeds were successfully separated between the seeds originating from the red and the yellow pepper, 87% accuracy for the red pepper seeds and 94% accuracy for the yellow pepper seeds. For the experiment with the different pepper fruit size, using data obtained from RGB imaging sensors, the seeds were successfully separated between the seeds originating from the regular and the small pepper fruit, 100% accuracy for the regular pepper seeds and 99.4% accuracy for the small pepper seeds. For the experiment with the two similar pepper lines, using data obtained from RGB imaging sensors, the seeds were successfully separated between the seeds originating from the indeterminate pepper plant and the determinate pepper plant, 97.6% accuracy for the indeterminate pepper seeds and 91.8% accuracy for the determinate pepper seeds. For the experiment with the two similar tomato lines, using data obtained from RGB imaging sensors, the seeds were successfully separated between the seeds originating from red fruit and the orange fruit, 90.6% accuracy for the red fruit seeds and 94.5% accuracy for the orange seeds. For the experiment with the two similar tomato lines, using data obtained from RGB imaging sensors, the seeds were successfully separated between the seeds originating from red fruit and the orange fruit, 90.6% accuracy for the red fruit seeds and 94.5% accuracy for the orange seeds. For the experiment with the two similar tomato lines, using data obtained from RGB imaging sensors, the seeds were successfully separated between the seeds originating from red fruit and the purple fruit, 98.3% accuracy for the red fruit seeds and 99% accuracy for the purple seeds. For the experiment with the two similar tomato lines representing different fruit structure, using data obtained from RGB imaging sensors, the seeds were successfully separated between the seeds originating from round fruit and the oval fruit, 97.6% accuracy for the round fruit seeds and 92.8% accuracy for the oval fruit seeds. For the experiment with the two similar tomato lines representing different plant structure, using data obtained from RGB imaging sensors, the seeds were successfully separated between the seeds originating from regular plant and the compact plant fruit, 80.1% accuracy for the regular plant seeds and 81.6% accuracy for the compact plant seeds. For the experiment with the two similar melon lines, using data obtained from RGB imaging sensors, the seeds were successfully separated between the seeds originating from white pale color and the yellow pale color, 95.8% accuracy for the white pale fruit seeds and 95.8% accuracy for the yellow pale fruit seeds. For the experiment with the two similar melon lines, using data obtained from RGB imaging sensors, the seeds were successfully separated between the seeds originating from high PH fruit and low PH fruit, 88% accuracy for the high PH fruit seeds and 90.8% accuracy for the low PH fruit seeds. For the experiment with the two similar melon lines, using data obtained from RGB imaging sensors, the seeds were successfully separated between the seeds originating from white flash color and the yellow flash color, 99.5% accuracy for the white flash fruit seeds and 100% accuracy for the yellow flash fruit seeds.

Example 8

GMO vs Non-GMO (Null) Classification

Materials & methods: Seed samples. Seeds of GMO events and their non-GMO (null), of 5 corn pairs of different lines were grown in a field under the same environmental conditions and in the same season. All seeds were treated the same way and went through the same processes, based on methods known in the art.

Image Acquisition and Analysis: Samples of at least 1000 seeds from each line were analyzed by the RGB imaging system. Images from each seed sample were captured using specialized RGB photography. For each sample, images were split randomly to three groups, training, validation and test of 80%/10%/10% respectively. This process was repeated 10 times for each sample. A convolutional neural network was trained using the training set. The trained neural network was used to predict the seed variant for the validation and test sets images. For each seed image of these sets, the neural net was used to output probabilities for the seed to belong to the trained lines. The sample with the highest probability was chosen. The percentage of correct predictions for each sample was saved.

Results: This example demonstrates the classification of lines of seeds into two groups—GMO vs its Null, which are two lines sharing high genome identity. Using data obtained from RGB imaging, the correct seed line was predicted. A total of 3 pairs were tested, and the line identification was for line A vs. A-null 96.59%; Line B vs. B-null 97.01%; line C vs C-null 98.38%.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant images of seeds will be developed and the scope of the term image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. The A system for sorting of seeds, comprising:
an interface adapted for receiving at least one image imaging a plurality of seeds which each having at least one visual feature,
wherein the at least one image is captured by at least one imaging sensor;
wherein the at least one visual feature is statistically similar to corresponding at least one visual feature extracted from another image of another seed of the plurality of seeds;
at least one hardware processor adapted for:
inputting the at least one image into at least one neural network; computing by the at least one neural network, an indication of at least one classification category of a plurality of classification categories for which visual features are not explicitly defined, for each of the plurality of seeds;
wherein the at least one neural network classifies the plurality of seeds which have similar extractable at least one visual feature into at least two different classification categories for which visual features are not explicitly defined;
wherein the at least one neural network is trained according to a training dataset comprising a plurality of training images of a plurality of seeds which have statistically similar extractable at least one visual feature captured by the at least one imaging sensor, wherein each respective training image of the plurality of training images is associated with an indication of at least one classification category of a plurality of classification categories for which visual features are not explicitly defined of at least one seed depicted in the respective training image; and
generating according to the indication of at least one classification category, instructions for execution by a sorting controller of an automated sorting device for automated sorting of seeds;
wherein the at least one image comprises a plurality of images imaging the plurality of seeds; wherein the at least one hardware processor is adapted for clustering the plurality of images according to respective classification categories, wherein the instructions for execution by the sorting controller comprise instructions for sorting the seeds corresponding to the plurality of images according to respective classification categories, and
at least one member selected from the group consisting of:
(I) wherein the seeds are at least one of: (i) isogenic, (ii) from a same mother but different paternal pollen and the clusters are computed according to the different paternal pollen, (iii) the seeds include self-pollinated and hybrid seeds and the clusters are computed according to self-pollinated and hybrid indications, and (II) wherein the clusters of different classification categories are at least one of: (i) created for seeds are grown under same environmental conditions, (ii) are created for seeds are grown at a same growing season, (iii) are created for seeds are grown at a same geographical location, (iv) are created for seeds having identical physical parameters within a tolerance range.

2. The system according to claim 1, wherein the similar extractable at least one visual feature is selected from the group consisting of: a hand-crafted feature, at least one size dimension of the at least one seed, color of the at least one seed, shape of the at least one seed, and texture of the at least one seed.

3. The system according to claim 1, wherein the at least one image includes a plurality of seeds that differ from one another within a tolerance range by a single feature that cannot be extracted by the at least one visual feature, and further comprising computing clusters according to a respective binary classification category computed for each seed, wherein the respective binary classification category is indicative of the respective seed including the single feature or not including the single feature, and wherein the instructions include instructions for sorting the seeds according to the computed clusters.

4. The system according to claim 3, wherein the binary classification category indicative of the single feature is selected from the group consisting of: self pollinated or hybrid pollinated, stress-resistant or non-stress resistant, genetically modified or non-genetically modified, isogenic seeds that differ by the single feature, and seeds of a shared mother plant with different paternal pollen.

5. The system according to claim 1, wherein the at least one classification category comprises at least one member selected from the group consisting of: (i) a non-visual category that cannot be manually determined based on visual inspection of the at least one seed, (ii) a seed variant, (iii) not directly correlated to DNA markers, (iv) a yield-related trait, (v) a monogenetic trait, (vi) a pleiotropic trait, (vii) a polygenetic trait, a (viii) plant quality related trait, (ix) a genotype, and (ix) at least one phenotypical property predicted to develop in the at least one seed at a future time interval relative to a time interval when the at least one image is captured.

6. The system according to claim 1, wherein the indication of the at least one classification category associated with respective plurality of training images of the training dataset comprises a seed variant determined according to a parent plant.

7. The system according to claim 1, wherein the indication of the at least one classification category associated with respective plurality of training images of the training dataset is based on a DNA test destructive to the seed from which it was obtained.

8. The system according to claim 1, wherein the at least one neural network computes an embedding for the at least one image, and wherein the at least one classification category is determined according to an annotation of an identified at least one similar embedded image from the training dataset storing embeddings of training images, the at least one similar embedded image identified according to a requirement of a similarity distance between the embedding of the at least one image and embedding of the training images.

9. The system according to claim 8, wherein the embedding is computed by an internal layer of the trained at least one neural network selected as an embedding layer.

10. The system according to claim 8, wherein the embedding is stored as a vector of a predefined length, wherein the similarity distance is computed as a distance between a vector storing the embedding of the at least one image and a plurality of vectors each storing embedding of respective training images.

11. The system according to claim 8, wherein the similarity distance is computed between the embedding of the at least one image and a cluster of embeddings of a plurality of training images each associated with a same at least one classification category.

12. A container comprising a plurality of seeds, wherein said plurality of seeds are sorted according to the system of claim 1.

13. The container of claim 12, wherein said plurality of seeds are identical with respect to a trait, a microbiome or a genome.

14. The container of claim 12, wherein at least one member is selected from the group consisting of: (i) wherein said plurality of seeds comprises more than 1000 seeds, and (ii) wherein said plurality of seeds weights more than 100 grams.

15. The container of claim 12, wherein said trait is selected from the group consisting of increased nitrogen use efficiency, increased abiotic stress tolerance, increased biotic stress tolerance, increased biomass, increased growth rate, increased vigor, increased yield and increased fiber yield or quality, and increased oil.

16. A method of growing a crop comprising seeding the seeds of the container of claim 12, thereby growing the crop.

17. The system of claim 1, wherein a statistical classifier trained for extraction of the at least one visual feature classifies the plurality of seeds which have similar extractable at least one visual feature into a same classification category for which visual features are explicitly defined.

18. A system for sorting of seeds, comprising:
an interface adapted for receiving at least one image imaging a plurality of seeds which each having at least one visual feature,
wherein the at least one image is captured by at least one imaging sensor;
wherein the at least one visual feature is statistically similar to corresponding at least one visual feature extracted from another image of another seed of the plurality of seeds;
at least one hardware processor adapted for:
inputting the at least one image into at least one neural network;
computing by the at least one neural network, an indication of at least one classification category of a plurality of classification categories for which visual features are not explicitly defined, for each of the plurality of seeds;
wherein the at least one neural network classifies the plurality of seeds which have similar extractable at least one visual feature into at least two different classification categories for which visual features are not explicitly defined;
wherein the at least one neural network is trained according to a training dataset comprising a plurality of training images of a plurality of seeds which have statistically similar extractable at least one visual feature captured by the at least one imaging sensor, wherein each respective training image of the plurality of training images is associated with an indication of at least one classification category of a plurality of classification categories for which visual features are not explicitly defined of at least one seed depicted in the respective training image; and generating according to the indication of at least one classification category, instructions for execution by a sorting controller of an automated sorting device for automated sorting of seeds;

wherein the at least one image comprises a plurality of images imaging the plurality of seeds of different classification categories, wherein the at least one neural network computes an embedding for each of the plurality of images, wherein the embedding of the plurality of images are clustered by clusterization code, and wherein the instructions for execution by the sorting controller comprise instructions for sorting the seeds according to corresponding clusters, and at least one member selected from the group consisting of:
(i) wherein the clusters are computed such that each embedded image member of each respective cluster is at least a threshold distance away from another cluster, (ii) wherein the clusters are computed such that each embedded image member of each respective cluster is less than a threshold distance away from every other member of the same respective cluster, (iii) wherein an intra-cluster distance computed between embeddings of a same cluster is less than an inter-cluster distance computed between embeddings of different clusters, (iv) wherein seeds corresponding to embeddings located above an abnormality distance threshold from at least one of: another embedding, and a cluster, are denoted as abnormal and clustered into an abnormal cluster, wherein seeds denoted as abnormal are assigned a new classification category according to classification categories assigned to at least two image embeddings and/or at least two clusters in proximity to the embedding of the seed denoted as abnormal, wherein the new classification category is computed according to relative distances to the at least two image embeddings and/or at least two clusters in proximity to the embedding of the seed denoted as abnormal, (v) wherein at least one statistical value is computed for each cluster, and wherein a certain seed is denoted as abnormal when the embedding of the image of the certain seed is statistically different from all other clusters, (vi) wherein at least one statistical value is computed for each cluster, and wherein a certain seed is assigned a certain classification category of a certain cluster when the embedding of the image of the certain seed is statistically similar to at least one statistical value of the certain cluster, (vii) further comprising providing an image of a target seed, computing the embedding of the target seed by the at least one neural network, and selecting a sub-set of the plurality of image embeddings according to image embedding located less than a target distance threshold away from the embedding of the target seed, wherein the instructions for execution by the sorting controller comprise instructions for selecting seeds corresponding to the sub-set of the plurality of image embeddings, (viii) further comprising providing an image of a target seed, computing the embedding of the target seed by the at least one neural network, clustering the plurality of image embeddings and the embedding of the target seed, and selecting a cluster that includes the embedding of the target seed, wherein the instructions for execution by the sorting controller comprise instructions for selecting seeds corresponding to the selected cluster.

19. A system for training at least one neural network for sorting of seeds, comprising:
at least one hardware processor for:
accessing a training dataset comprising a plurality of training images imaging a plurality of seeds captured by at least one imaging sensor, wherein each respective training image of the plurality of training images is associated with an indication of at least one classification category of a plurality of classification categories for which visual features are not explicitly defined of at least one seed depicted in the respective training image, wherein the at least one visual feature of one of the plurality of seeds which extracted from one of the plurality of training images is statistically similar to at least one corresponding visual feature extracted from another image of the plurality of training images of another seed of the plurality of seeds;

training at least one neural network according to the training dataset, the at least one neural network trained for computing an indication of at least one classification category according to at least one target image comprising at least one seed captured by at least one imaging sensor; and generating according to the indication of at least one classification category, instructions for execution by a sorting controller of an automated sorting device for automated sorting of seeds wherein the at least one neural network classifies the plurality of seeds which have similar extractable at least one visual feature into at least two different classification categories for which visual features are not explicitly defined, wherein the indication of at least one classification category of a plurality of classification categories for which visual features are not explicitly defined, of the at least one target image is computed at least according to weights of the at least one trained neural network;

wherein the at least one image comprises a plurality of images imaging the plurality of seeds; wherein the at least one hardware processor is adapted for clustering the plurality of images according to respective classification categories, wherein the instructions for execution by the sorting controller comprise instructions for sorting the seeds corresponding to the plurality of images according to respective classification categories, and at least one member selected from the group consisting of:
(I) wherein the seeds are at least one of: (i) isogenic, (ii) from a same mother but different paternal pollen and the clusters are computed according to the different paternal pollen, (iii) the seeds include self-pollinated and hybrid seeds and the clusters are computed according to self-pollinated and hybrid indications, and
(II) wherein the clusters of different classification categories are at least one of: (i) created for seeds are grown under same environmental conditions, (ii) are created for seeds are grown at a same growing season, (iii) are created for seeds are grown at a same geographical location, (iv) are created for seeds having identical physical parameters within a tolerance range.

* * * * *